(12) United States Patent
Smith et al.

(10) Patent No.: US 7,711,623 B2
(45) Date of Patent: May 4, 2010

(54) DECISION ASSISTANCE PLATFORM CONFIGURED FOR FACILITATING FINANCIAL CONSULTING SERVICES

(75) Inventors: Eric S. Smith, Waterford, MI (US); Joseph Simko, Sterling Heights, MI (US)

(73) Assignee: Consulting Services Support Corporation, Troy, MI (US)

( * ) Notice: Subject to any disclaimer, the term of this patent is extended or adjusted under 35 U.S.C. 154(b) by 1309 days.

(21) Appl. No.: 10/923,512

(22) Filed: Aug. 20, 2004

(65) Prior Publication Data

US 2006/0041491 A1    Feb. 23, 2006

(51) Int. Cl.
*G06Q 40/00* (2006.01)

(52) U.S. Cl. .................... 705/36 R; 705/35
(58) Field of Classification Search ............ 705/36 R
See application file for complete search history.

(56) References Cited

U.S. PATENT DOCUMENTS

| | | | |
|---|---|---|---|
| 5,918,217 A * | 6/1999 | Maggioncalda et al. ... | 705/36 R |
| 6,317,726 B1 | 11/2001 | O'Shaughnessy | |
| 6,601,044 B1 | 7/2003 | Wallman | |
| 7,039,608 B2 | 5/2006 | Johnson et al. | |
| 7,149,713 B2 * | 12/2006 | Bove et al. ............... | 705/36 R |
| 7,366,692 B2 | 4/2008 | Alcaly et al. | |
| 7,536,332 B2 * | 5/2009 | Rhee ........................ | 705/35 |
| 2002/0138383 A1 | 9/2002 | Rhee | |
| 2003/0093352 A1 * | 5/2003 | Muralidhar et al. ......... | 705/36 |
| 2004/0073442 A1 | 4/2004 | Heyns et al. | |
| 2004/0133439 A1 | 7/2004 | Noetzold et al. | |
| 2004/0172357 A1 | 9/2004 | Padgette | |
| 2005/0004857 A1 | 1/2005 | Schwarz et al. | |

FOREIGN PATENT DOCUMENTS

WO    WO 2004/034232 A2    4/2004

OTHER PUBLICATIONS

Adler, Ralph W., Strategic Investment Decision Appraisal Techniques: The Old and the New, Nov. 2000, Business Horizons.*
Viezer, Timothy W., Constructing Real Estate Investment Portfolios, Oct. 1999, Business Economics, v34n4, pp. 51-58.*

* cited by examiner

*Primary Examiner*—Charles R Kyle
*Assistant Examiner*—Seth Weis
(74) *Attorney, Agent, or Firm*—Raymond M. Galasso; Galasso & Associates, L.P.

(57) ABSTRACT

A system includes instructions configured for enabling the one or more data processing device to facilitate preparing client-specific template information and determining client-specific consulting information dependent upon the client-specific template information. The client specific template information includes performance criteria, weightings, defined investment dataset information, filters configured for refining investment dataset information and/or process instructions. Examples of client specific consulting information include investment index performance scores, performance scores of investments in an investment portfolio, objectively quantified investment choices, asset class corresponding to allocated investment within an investment portfolio, comparative performance analyses between allocated investments and non-allocated investments represented within an asset class, and other information utilized by an investor for making investment decisions.

28 Claims, 13 Drawing Sheets

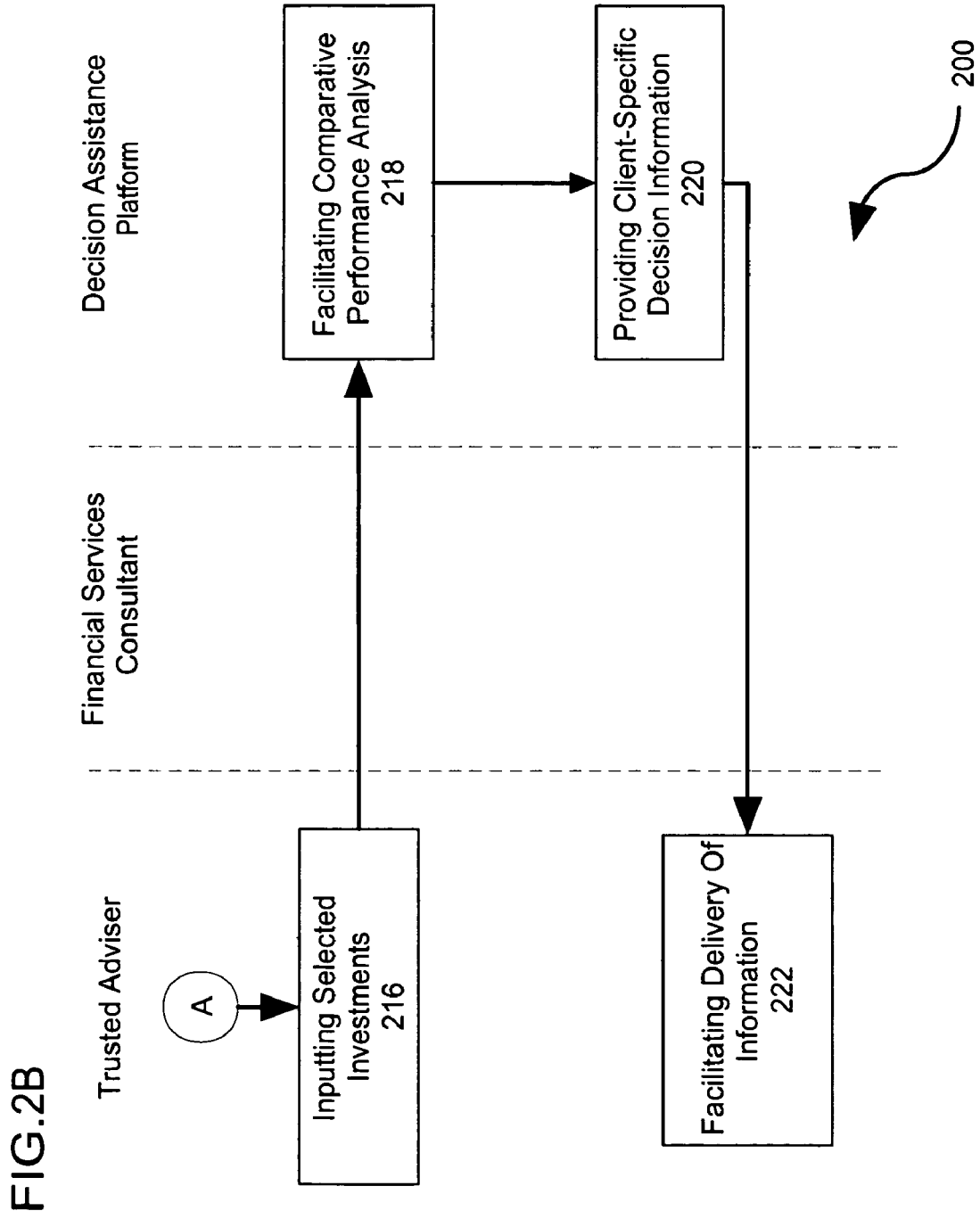

FIG. 6B

| Asset Class | Mutual Fund | Score | Relevant Index | Index Score | Difference |
|---|---|---|---|---|---|
| Aggressive Growth | Bridgeway Aggr Grth | 6.4080 | NASDAQ | 4.4731 | 1.9349 |
| Aggressive Growth | Meridian Value Fund | 6.8883 | NASDAQ | 4.4731 | 2.4152 |
| Growth | Fidelity Mid Cap Stck | 7.4375 | S&P | 6.1244 | 1.3131 |
| Growth | Growth Fund Of America | 7.0938 | S&P | 6.1244 | 0.9694 |
| Growth | White Oak Grth Fd | 5.1517 | S&P | 6.1244 | -0.9727 |
| Growth & Income | Ameristock Mutual Fund | 8.2398 | DJI | 7.5415 | 0.6983 |
| Growth & Income | Calamos Convrble G&I | 8.5636 | DJI | 7.5415 | 1.0221 |
| Growth & Income | Pimco Renaissance | 9.2307 | DJI | 7.5415 | 1.6892 |
| Taxable Bonds | Alliance Americas Gov Inc | 5.3365 | LBAB | 5.6634 | -0.3269 |
| Taxable Bonds | Blackrock Intl Bd | 5.5590 | LBAB | 5.6634 | -0.1044 |
| Taxable Bonds | Calvert Income | 5.9690 | LBAB | 5.6634 | 0.3056 |
| World Equity | Aim Gl Health Care | 6.5407 | EAFE | 3.9840 | 2.5567 |
| Composite | Your Portfolio | 7.3298 | Composite Index | 6.1672 | 1.1626 |

FIG. 7

429 Managers In Asset Class - 429 Managers Qualified For Further Analysis - Top Scores Shown Below

| Highest Ranked Managers (Period Ending 12/31/2003) | 5 Year Average Return | 5 Year Standard Deviation | 3 Year Standard Deviation | 3 Year Average Return | 1 Year Return | Composite Score |
|---|---|---|---|---|---|---|
| 1) SMH Cap Advs, Inc. (Diversified Fixed Income) | | | | | | 8.3493 |
| 2) Karpus Inv Mgt Co. (Fixed Income Mgt) | | | | | | 7.4163 |
| 3) Dreyfus Inv Advs, Inc. (Core Plus) | | | | | | 7.3889 |
| 4) Dwight Asset Mgt Co. Inc. (Active GIC/Stable Value Portfolio Mgmt) | | | | | | 7.3575 |
| 5) Fiduciary Cap Mgt, Inc. (Stable Value) | | | | | | 7.3469 |
| 6) Dodge and Cox (Dodge & Cox Fixed Income) | | | | | | 7.3176 |
| 7) Sample Manager (Fixed Income) | | | | | | 7.2785 |
| 8) Conseco Cap Mgt, Inc. (Core Plus Fixed Income) | | | | | | 7.2419 |
| 9) Galliard Cap Mgt, Inc. (Wells Fargo Stable Return Fund) | | | | | | 7.2379 |
| 10) Dwight Asset Mgt Co. Inc. (Sei Stable Asset (Commingled Fund)) | | | | | | 7.2377 |
| 11) Deutsche Asset Mgt (Core Plus Fixed Income (Full Discretion)) | | | | | | 7.2207 |
| 12) Sit Inv Asso, Inc. (Short Duration) | | | | | | 7.2143 |
| 13) Sun Cap Advisers (Private Placements Composite I) | | | | | | 7.2129 |
| 14) Taplin, Canida & Habacht (Domestic Fixed Income) | | | | | | 7.1976 |
| 15) Pacific Inv Mgt Co. (Moderate Duration - Core Plus Full Authority) | | | | | | 7.1899 |
| Other Rankings of Interest | | | | | | |
| 188) Lehman Brothers Aggregate Bond | | | | | | 6.7628 |

DECISION ASSISTANCE PLATFORM CONFIGURED FOR FACILITATING FINANCIAL CONSULTING SERVICES

CROSS REFERENCE TO RELATED APPLICATIONS

The United States non-provisional patent applications entitled "METHOD CONFIGURED FOR FACILITATING FINANCIAL CONSULTING SERVICES" having Ser. No. 10/923,658 and "SYSTEM AND METHOD CONFIGURED FOR FACILITATING FINANCIAL ANALYSIS" having Ser. No. 10/923,659, which each have a common applicant herewith and are filed the same day herewith, are incorporated herein by reference.

FIELD OF THE DISCLOSURE

The inventive disclosures made herein relate generally to financial consulting methodologies and more particularly to systems and methods configured for facilitating financial consulting services.

BACKGROUND

Many financial experts and investors would agree that there has been a considerable increase in the lack of investor trust within the traditional financial services industry. Circumstances responsible for this lack of trust include poor advice from financial advisors, advice based on flawed and/or inaccurate information, predatory sales tactics, and corrupt financial organization. The circumstances that have led to this lack of trust have contributed to a general market decline (i.e., value of funds and number of persons investing), which is a circumstance quite damaging to the equity markets and the ability of companies to raise capital (as well as damaging to a transaction and product sales-based industry—the traditional financial industry).

Product vendors and their paid salespeople generally control and often limit access to product information. Vendors typically do not want consumers to have a practical way to objectively evaluate their products in comparison with those of others. Such an ability to objectively compare (i.e., comparatively evaluate) products being offered would effectively commoditize financial products, and would adversely impact the large advertising and marketing budgets of these large product vendors. Guarding against the risk that industry products such as mutual funds are not turned into commodities was listed as one of top challenges facing the Investment Company Institute's membership, as was stated in the Jun. 20, 200 Financial Planning Journal of the Bureau of National Affairs.

Brokers and other product salespeople from the traditional financial services industry continually approach prospective and active individual investors (i.e., consumers) to solicit the consumer to buy their financial products. In general, these brokers and salespeople are approaching the consumers not necessarily because their financial products are needed or have been requested, but because that is their job. They have been hired to sell a particular organization's financial products to whomever they can.

Over the past 15 or more years, there has been a general trend within the financial services marketplace away from individual advice and guidance toward product sales. This can be envisioned in what can be described as a customer—client continuum, where at one end (i.e., the customer side) of the continuum a person is treated as a customer to be sold and, at the other end (i.e., the client side), the person is treated as a client to be advised. This trend toward the customer side of the continuum is leaving an increasingly large void at the client side of the continuum.

In an environment with ever-growing numbers of financial products (e.g., over 13,000 mutual funds and thousands of insurance products), consumers have no practical approach for obtaining information on all of these choices and no practical approach for comparing them (e.g., to see which would be best for them) even if they could obtain the needed information. This lack of knowledge is often exploited by the traditional financial services industry. Because trusted advisers of consumers (e.g., attorneys and Certified Public Accountants) lack sufficient knowledge of and information about these many financial products, even these trusted advisors are often limited in what they can do to protect their clients from having this lack of product knowledge exploited. This limitation often holds true even if they are able to obtain such information, because of the overwhelming volume of such information.

Yet another limitation of such conventional financial products and services is that related conventional processes used to select and recommend money managers are essentially "opaque". Such processes are typically not disclosed and, often, the fiduciaries of such product and services do not request a description or explanation of the means by which these money managers are selected and/or recommended. With this process being essentially opaque, any number of abuses can occur with limited means for readily detecting them.

Most consumers of financial products would prefer the option of having a trusted adviser such as their attorney or CPA (i.e., someone without a product sales agenda) provide them with advice relating to investment decisions, and to insulate themselves from the sales pressures inherent in the traditional financial services industry. Therefore, methods and equipment configured for facilitating financial consulting services via trusted advisers who are not necessarily professionals within the traditional financial services industry would be useful.

SUMMARY OF THE DISCLOSURE

In accordance with one embodiment of the inventive disclosures made herein, a system comprises one or more data processing device, instructions processable by the one or more data processing device, and an apparatus from which the instructions are accessible by the one or more data processing device. The instructions are configured for enabling the one or more data processing device to facilitate preparing client-specific template information and determining client-specific consulting information dependent upon the client-specific template information. The client specific template information includes performance criteria, weightings, defined investment dataset information, filters configured for refining investment dataset information and/or process instructions.

In accordance with another embodiment of the inventive disclosures made herein, a system comprises one or more data processing device, instructions processable by the one or more data processing device, and an apparatus from which the instructions are accessible by the one or more data processing device. The instructions are configured for enabling the one or more data processing device to facilitate receiving client background information, preparing client-specific template information dependent upon the client background information, and determining client-specific consulting information dependent upon the client-specific template information.

In accordance with another embodiment of the inventive disclosures made herein, a system comprises one or more data processing device, instructions processable by the one or more data processing device, and an apparatus from which the instructions are accessible by the one or more data processing device. The instructions are configured for enabling the one or more data processing device to facilitate determining client-specific investment choices dependent upon client-specific template information and objectively quantifying the investment choices dependent upon the client-specific template information thereby generating objectively quantified investment choices. The client-specific template information includes performance criteria, weightings, defined investment dataset information, filters configured for refining investment dataset information and/or process instructions.

In accordance with another embodiment of the inventive disclosures made herein, a system comprises means for determining a collection of indices, means for determining a composite investment index performance score dependent upon information related to the indices, and means for assessing the investment portfolio dependent upon information related to the composite investment index performance score. Each one of the indices corresponds to a respective investment within an investment portfolio.

In accordance with another embodiment of the inventive disclosures made herein, a system comprises means for determining a plurality of investment performance scores, means for determining a plurality of investment index performance scores, wherein each one of the investment index performance scores corresponds to a respective investment index and wherein the respective investment index corresponds to a respective one of the investment performance scores, and means for assessing each one of the investment performance scores dependent upon information related to a respective one of the investment index performance scores. Each one of the investment performance scores corresponds to a respective investment of an investment portfolio.

In accordance with another embodiment of the inventive disclosures made herein, a system comprising means for determining an asset class corresponding to an allocated investment of an investment portfolio, and means for performing a comparative performance assessment between the allocated investment and a plurality of non-allocated investments represented by the asset class.

Correspondingly, it is a principal object of the inventive disclosures made herein to provide a solution that overcomes limitations and drawbacks associated with conventional approaches for facilitating financial services for clients. Specifically, methods disclosed herein enable facilitation of financial consulting services via a trusted adviser of the client, but who is not necessarily a professional within the traditional financial services industry. Furthermore, such methods produce consulting information (e.g., investment choices) that is objectively quantified. Accordingly, embodiments of methods in accordance with the inventive disclosures made herein enable a client to make decisions in an objective and unbiased manner.

Turning now to specific embodiments of the inventive disclosures made herein, in at least one embodiment of the inventive disclosures made herein, performance criteria include parameters designating a desired performance effect of an investment for the client.

In at least one embodiment of the inventive disclosures made herein, preparing client-specific template information includes quantitatively and/or qualitatively representing performance criteria.

In at least one embodiment of the inventive disclosures made herein, determining client-specific consulting information includes creating a hierarchical weighting structure and distributing weightings to performance factors and class nodes In at least one embodiment of the inventive disclosures made herein, a hierarchical weighting structure includes a plurality of parent class nodes and a performance factor and/or a child class node associated with one or more parent class nodes.

In at least one embodiment of the inventive disclosures made herein, distributing weightings includes assigning relative weightings and calculating actual weightings dependent upon information derived from the relative weightings.

In at least one embodiment of the inventive disclosures made herein, each parent class node includes a plurality of performance factors and/or a combination of one or more performance factors and one or more child class nodes.

In at least one embodiment of the inventive disclosures made herein, providing client-specific template information includes outputting client-specific consulting information, displaying client-specific consulting information and/or enabling access to client specific investment information for the purpose of determining related information.

In at least one embodiment of the inventive disclosures made herein, determining client-specific consulting information includes determining client-specific investment choices dependent upon information derived from the performance criteria, and objectively quantifying the investment choices dependent upon information derived from the performance criteria for generating objectively quantified investment choices.

In at least one embodiment of the inventive disclosures made herein, objectively quantifying investment choices includes determining a collection of indices and determining a composite investment index performance score dependent upon information derived from the indices.

In at least one embodiment of the inventive disclosures made herein, investment indices correspond to a respective investment within an investment portfolio.

In at least one embodiment of the inventive disclosures made herein, objectively quantifying investment choices includes determining an asset class corresponding to an allocated investment within an investment portfolio, and performing a comparative performance assessment between the allocated investment and a plurality of non-allocated investments represented within the asset class.

In at least one embodiment of the inventive disclosures made herein, objectively quantifying investment choices includes determining a plurality of investment performance scores and determining a plurality of investment index performance scores.

In at least one embodiment of the inventive disclosures made herein, each investment performance score corresponds to a respective investment within an investment portfolio.

In at least one embodiment of the inventive disclosures made herein, objectively quantifying investment choices includes determining a composite investment performance score based upon the investment performance scores and determining a composite investment index performance score dependent upon information derived from the investment index performance scores.

In at least one embodiment of the inventive disclosures made herein, determining client-specific consulting information includes determining an asset class corresponding to an allocated investment within an investment portfolio and performing a comparative performance assessment between the allocated investment and a plurality of non-allocated investments represented within the asset class.

In at least one embodiment of the inventive disclosures made herein, determining client-specific consulting information includes determining a plurality of investment performance scores and determining a plurality of investment index performance scores.

These and other objects and embodiments of the inventive disclosures made herein will become readily apparent upon further review.

BRIEF DESCRIPTION OF THE DRAWING FIGURES

FIGS. 2A and 2B depict a method for facilitating financial consulting services in accordance with embodiments of the disclosures herein and in view of the information flow schematic depicted in FIG. 1.

Figure 5:
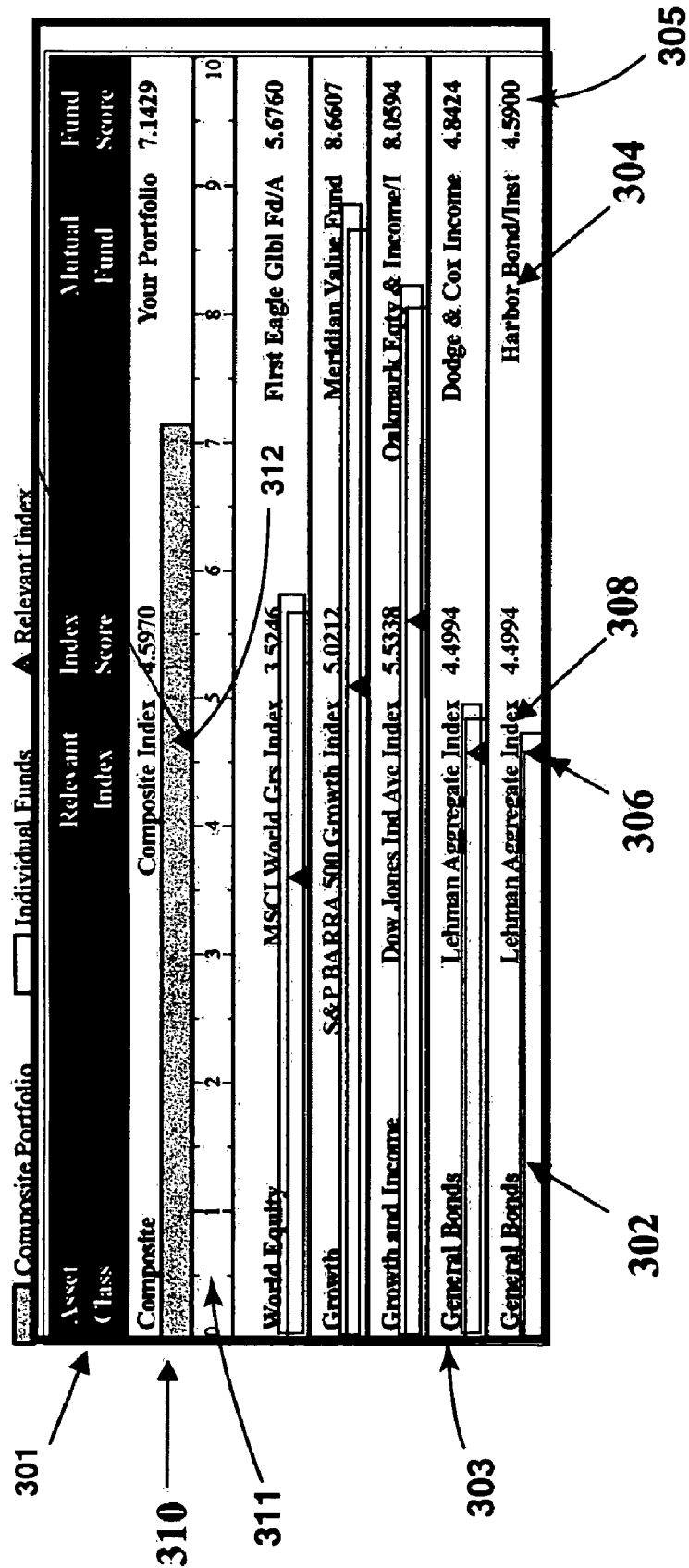
FIG. 5 is a chart depicting a graphical representation of performance scores in accordance with an embodiment of the inventive disclosures made herein.
Figure 6A:
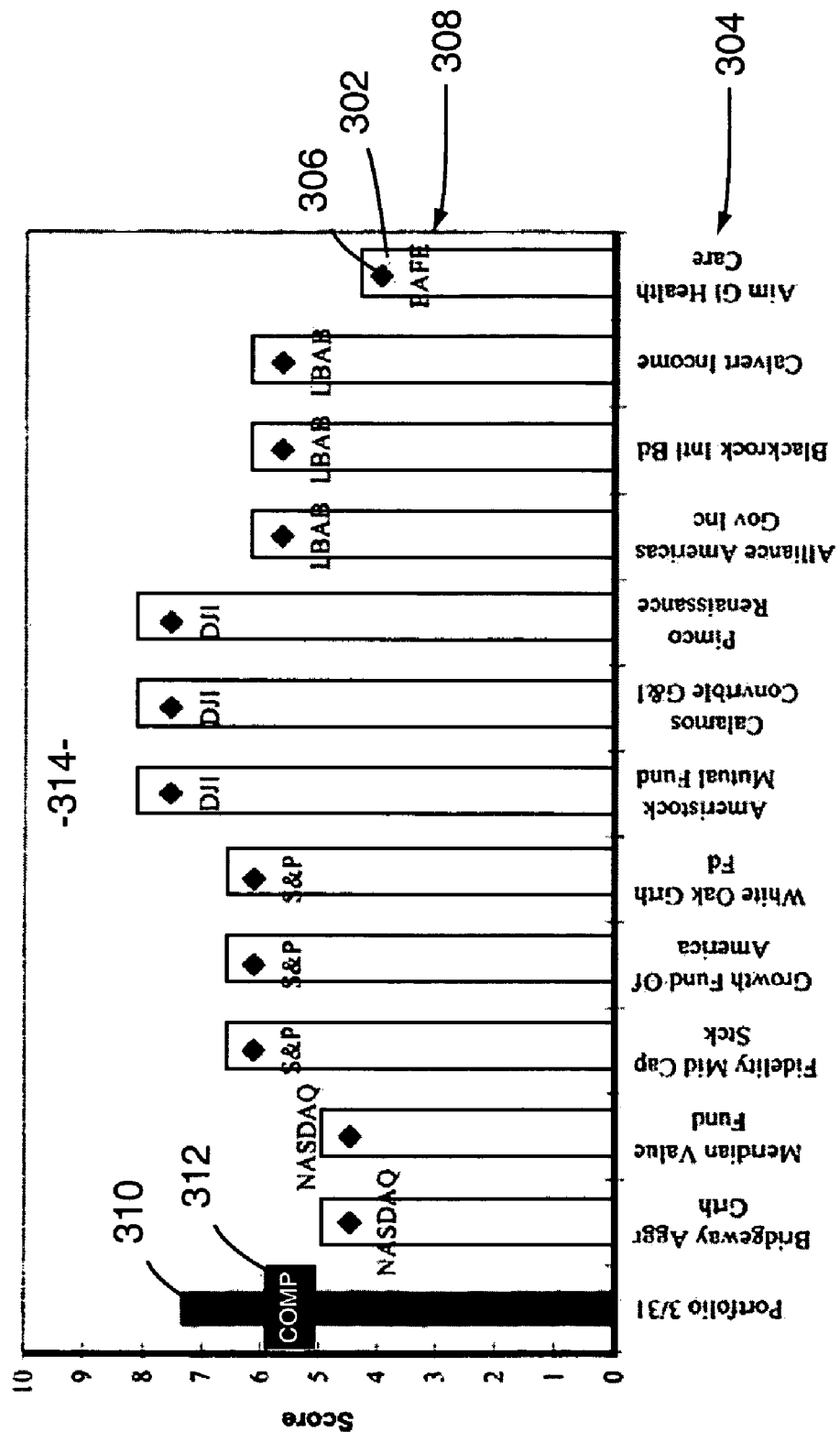

FIGS. 6A and 6B jointly depict an alternate embodiment for presenting the information depicted in the chart of FIG. 5.

FIG. 7 depicts a table having a plurality of multi-segment bars that graphically represent corresponding composite scores.

Figure 8A:
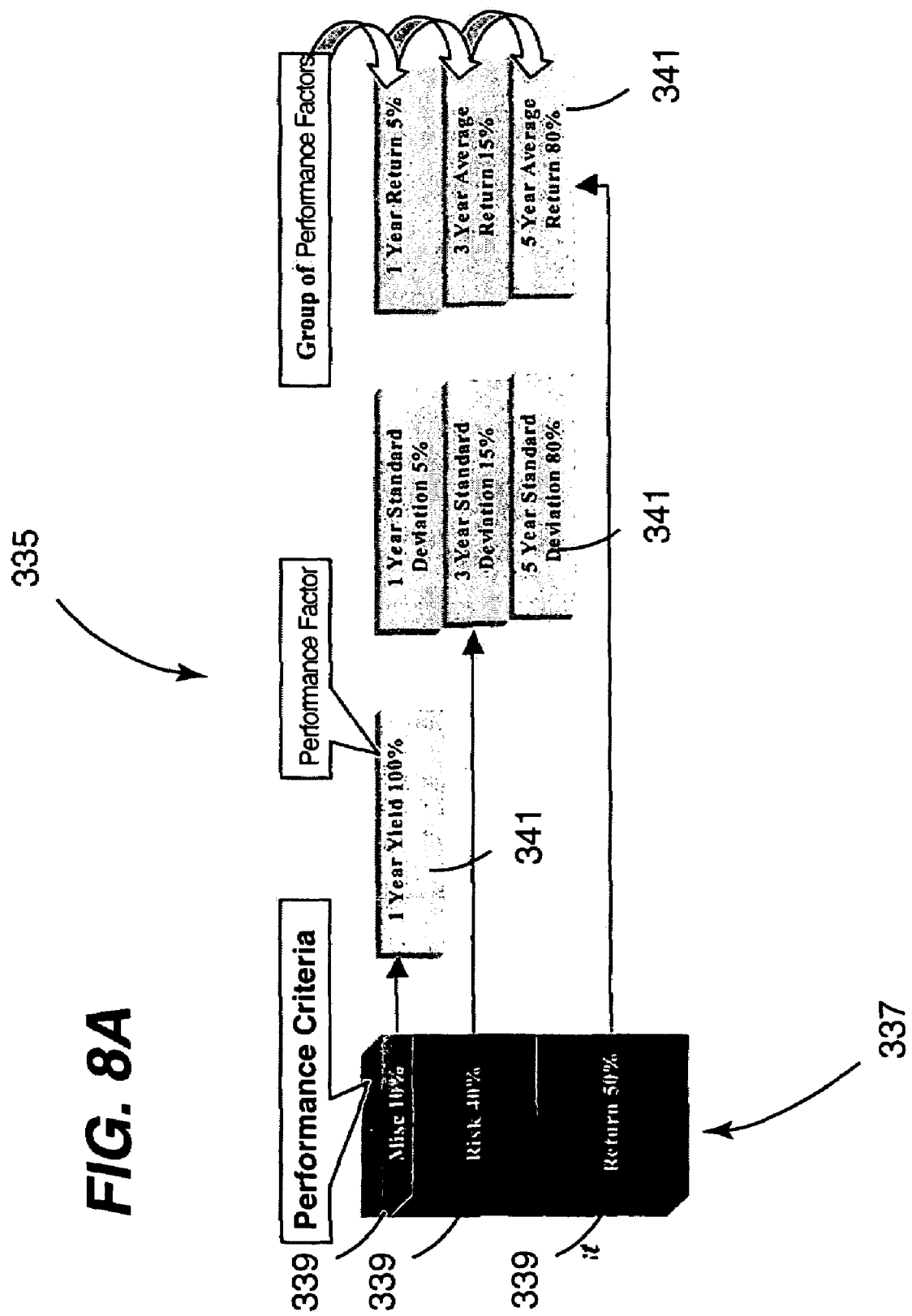
Figure 8B:
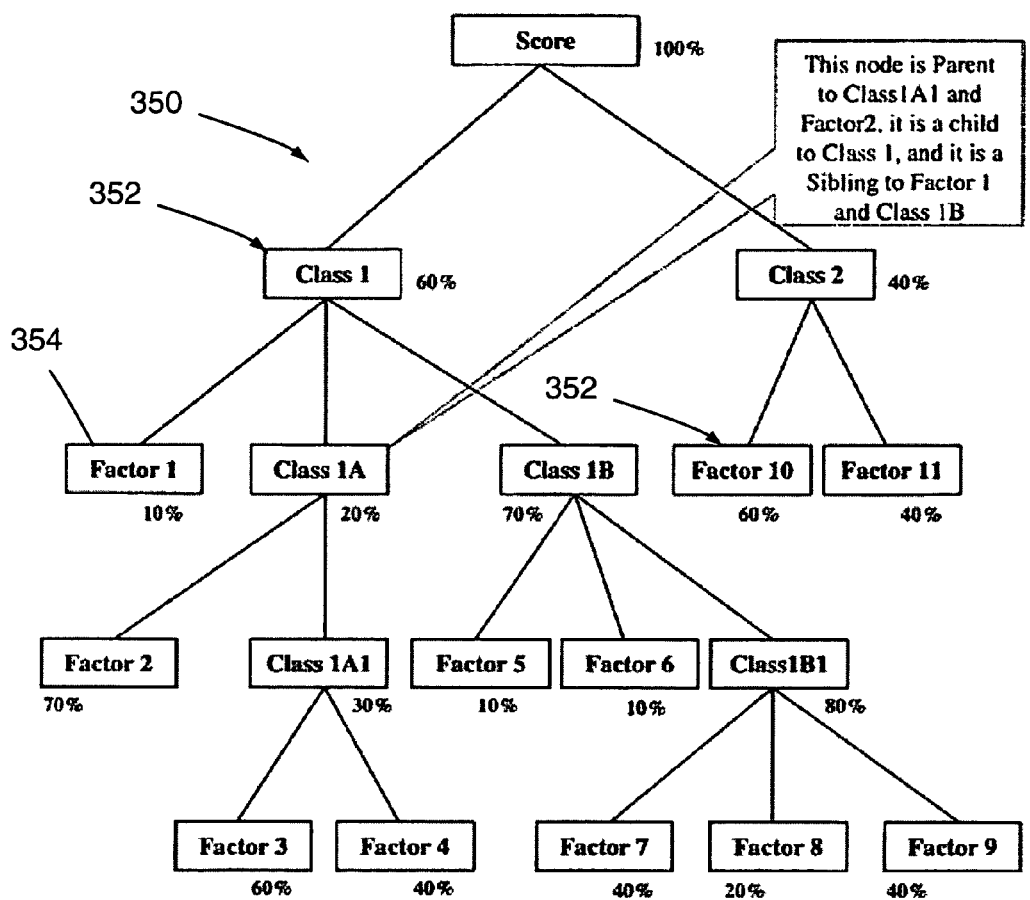
Figure 8C:
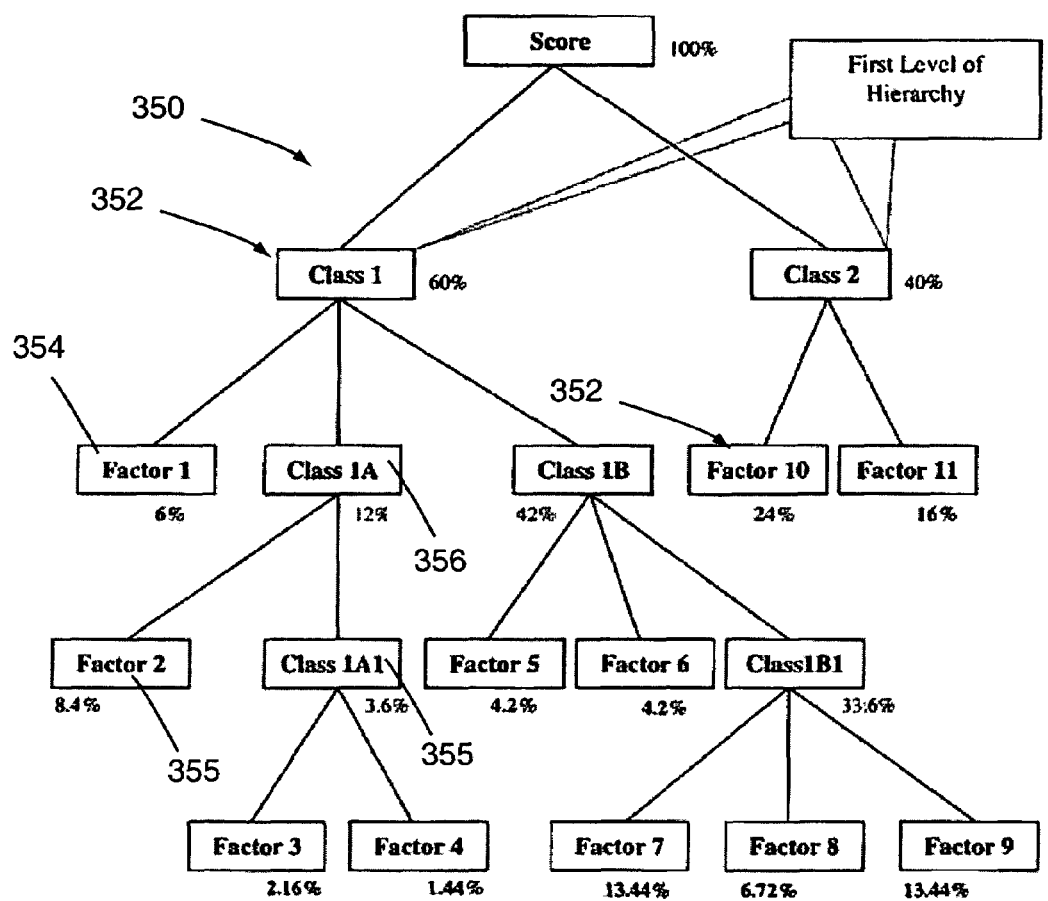

FIG. 8A depicts an embodiment of a weighting approach configured for facilitating a performance assessment in accordance with the inventive disclosures made herein FIGS. 8B and 8C depict an embodiment of a hierarchical weightings structure in accordance with the inventive disclosures made herein.

Figure 9:
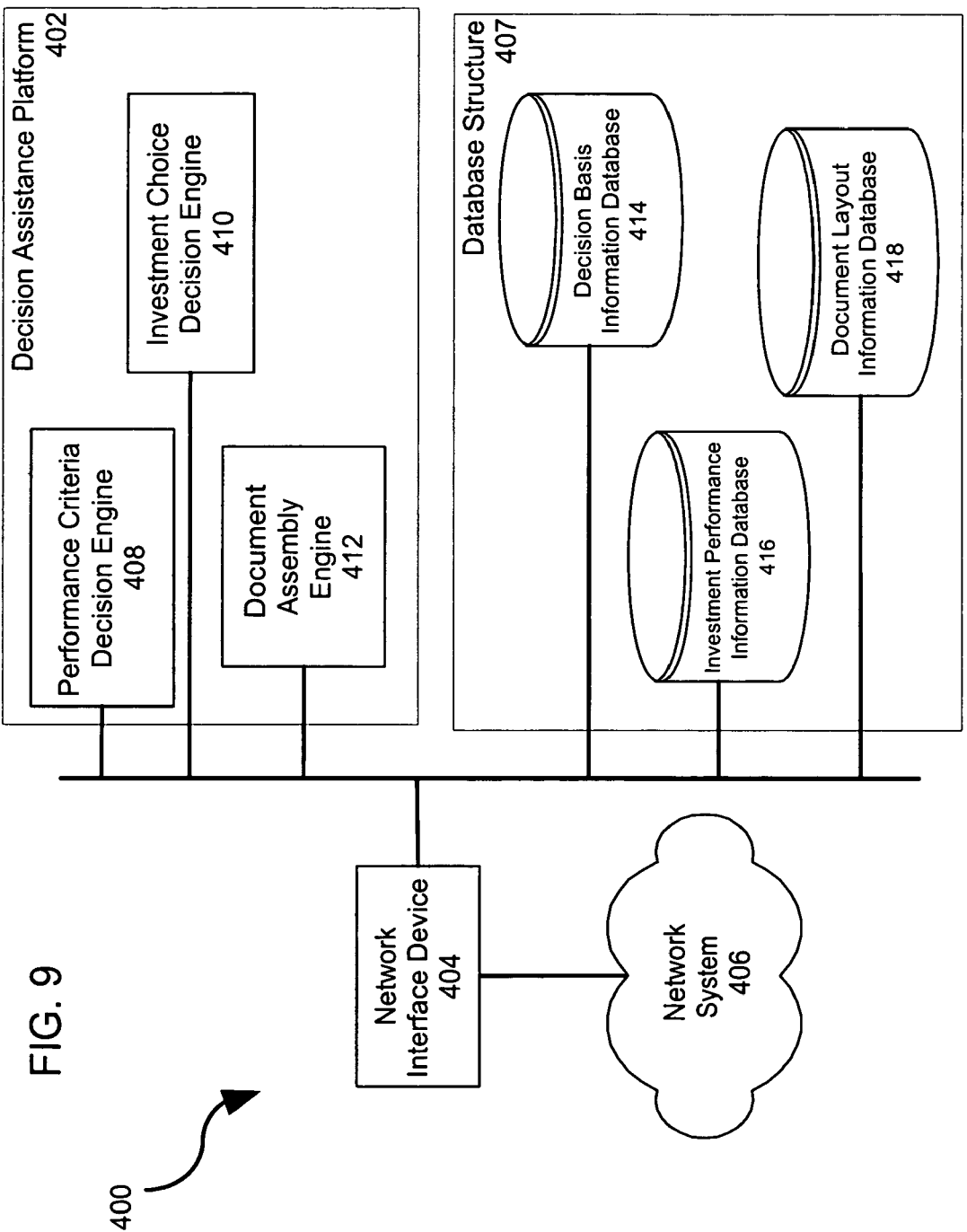

FIG. 9 depicts a network system configured for facilitating financial consulting services functionality in accordance with embodiments of the inventive disclosures made herein.

DETAILED DESCRIPTION OF THE DRAWING FIGURES

Figure 1:
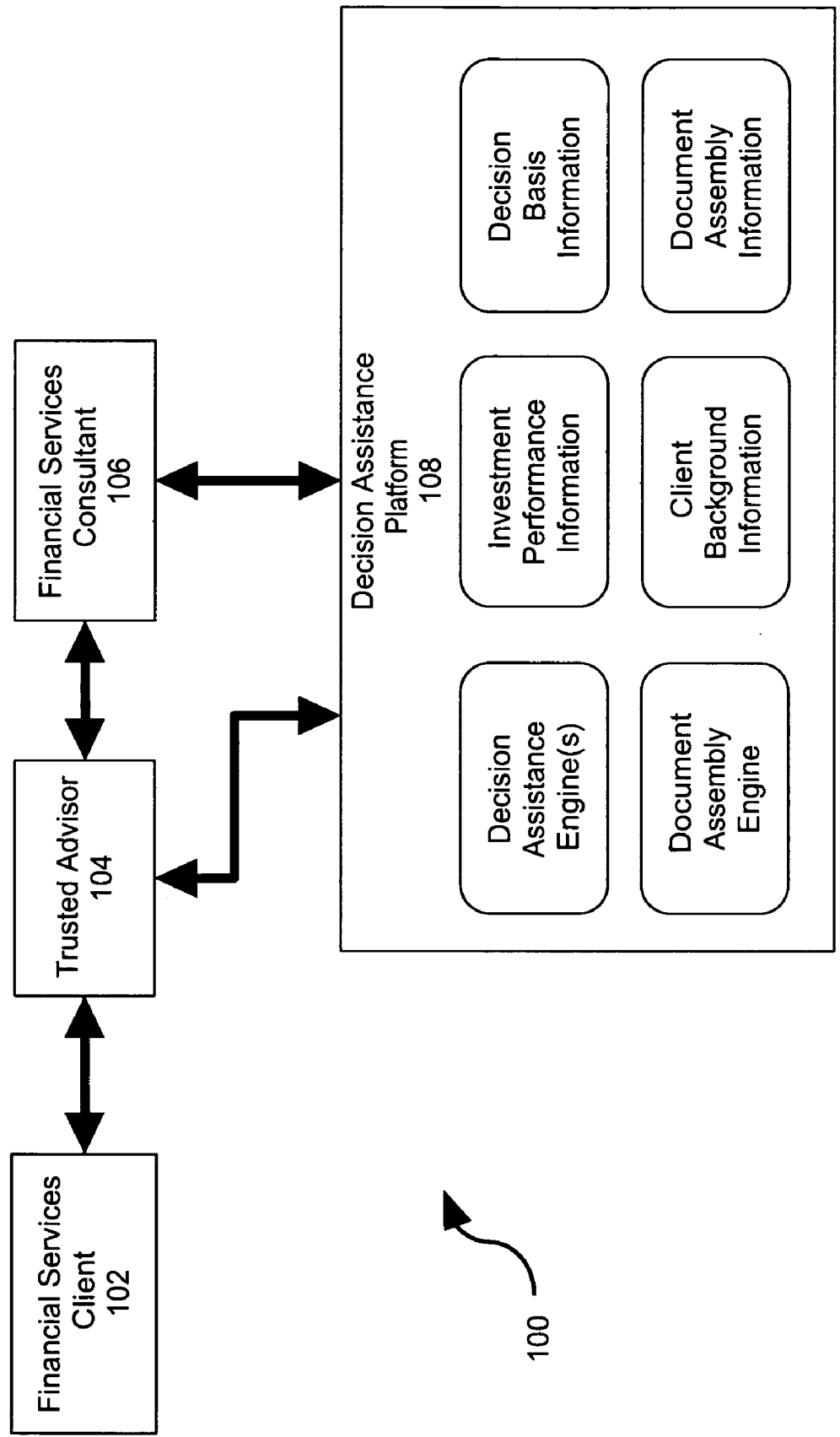
FIG. 1 depicts an information flow schematic in accordance with an embodiment of the inventive disclosures made herein.

An embodiment of an information flow schematic 100 in accordance with the inventive disclosures made herein is depicted in FIG. 1. Entities within the information flow schematic include a financial services client 102, a trusted advisor 104 (i.e., an affiliated trusted advisor), a financial services consultant 106 and a decision assistance platform 108 (i.e., a system). Communication of information (e.g., client background information and/or client-specific consulting information) is carried out between the financial services client 102 and the trusted advisor 104. Similarly, communication of information (e.g., client background information and/or client-specific consulting information) is carried out between the trusted advisor 104, the financial service consultant 106 and the decision assistance platform 108.

In the embodiment of the information flow schematic 100 depicted in FIG. 1, the trusted advisor 104 is a separate person/entity from the financial services consultant 106 and isolates the financial services client 102 from direct interaction with the financial services consultant 106 and the decision assistance platform 108. In another embodiment (not specifically shown), the trusted advisor 104 and the financial services consultant are the same person (e.g., an attorney, CPA or family member), whereby that same person isolates the financial services client 102 from in-depth and/or direct interaction with the decision assistance platform 108. In still another embodiment (not specifically shown), the trusted advisor 104 and the financial services consultant are different persons acting on behalf of the financial services client 102 from within a common organization (e.g., an attorney and CPA employed by a common local, national or international consulting firm), whereby the common organization isolates the financial services client 102 from in-depth and/or direct interaction with the decision assistance platform 108. In yet another embodiment (not specifically shown), the financial services client 102 serves as his or her own trusted advisor and financial services consultant, whereby the financial services client 102 directly interacts with the decision assistance platform 108.

It is disclosed herein that interaction and communication between the financial services client 102, the trusted advisor 104 (i.e., an affiliated trusted advisor), the financial services consultant 106 and/or the decision assistance platform 108 may be implemented via a networked computer systems. For example, via the network system 400 depicted in FIG. 9, such interaction and communication may be facilitated via a networked computer system. The Internet is one embodiment of such a networked computer system. As such, it is disclosed herein that a website may be provided for enabling such interaction and communication. Specific examples of such interaction and communication include, information acquisition functionality (e.g., receiving background information from the client), service payment functionality (electronically receiving payment for services), distributed processing functionality (e.g., where various decision assistance functionality is performed in a distributed manner), consulting information delivery functionality (e.g., providing client-specific consulting information such as objectively-quantified investment choices and client-specific reports to the client and/or trusted advisor), etc.

The decision-assistance platform 108 accesses and/or is provided information about, for example, the client (e.g., the client's life circumstances, investment preferences, financial position, financial goals, risk tolerances, etc.), decision basis information (including, without limitation, asset allocation technology and rule set), investment performance information (both with regard to all available product choices and client-specific, historic performance information) and document format template information for performing associated decision assistance functionality. In one embodiment, information utilized in carrying out decision assistance functionality as disclosed herein (e.g., manually and/or by a decision assistance platform) is stored in and accessible from one or more databases. Examples of decision assistance functionality, as discussed below in greater detail, include inputting, compiling and/or determining information comprised by a client-specific template and determining client-specific consulting information (e.g., determining client-specific investment choices) at least partially dependent upon decision basis information. Examples of such decision basis information include information relating to prescribed decision-making rules, information relating to investment effect selection and information relating to correlating investments opportunities to client financial needs, desires and/or goals. Examples of investment performance information include information associated with returns on an investment, information associated with risk of an investment, information associated with other performance and structural characteristics of an investment (e.g., manager tenure, turnover ratio, internal fee/cost structures, etc.) and information associated with compiling comparative analyses of performance and structural data. Examples of document format information include information associated with formatting prescribed documents, content included within prescribed documents and information associated with outputting information related to making investment choices (e.g., creating a printed document including such information and/or displaying such information). Decision basis information, investment performance information, and document format information are examples of client-specific consulting information in view of a particular client and facilitating decision assistance functionality in accordance with the inventive disclosures made herein.

In accordance with at least one embodiment of the inventive disclosures made herein, decision assistance functionality disclosed herein is carried out by a decision assistance platform that comprises a first decision engine (e.g., a rules-based expert system) and a second decision engine (e.g., a investment selection optimization system). The first decision engine facilitates creation of a client-specific template that represents a client-specific profile comprising various information (e.g., rules, data sets, processing instructions, performance criteria, etc). Examples of such information comprised by the client-specific template include performance weightings and factors (e.g., parameters corresponding to investment effects desired by the client), defined data and/or datasets, logic conditional filters for designating manipulation (e.g., refining/slimming datasets) of datasets, and processing instructions. The processing instructions represent information that enables tasks such as proper utilization of factors, weightings and filters to be facilitated, that enables document assembly functionality to be facilitated (e.g., automated report generation) and information related to recursive analysis/assessment of investment information. Information comprised by the client-specific template is utilized by the second decision engine to facilitate scoring and ranking processes for optimizing investment selection (i.e., generating investment choices) in a manner consistent with a client's individual needs, goals and desires. Such instructions include information relating to appropriate percentage allocation of investments among available asset classes (i.e., the asset allocation), to appropriate blending of performance factors and/or to appropriate weighting of such factors. The scoring and ranking processes includes enabling assessment of investment choices in a manner that is intended to aid a client in identifying which money management teams have historic performance that most closely matches the investment experiences that the client desires (i.e., what investment effect the client desires).

Figure 2A:
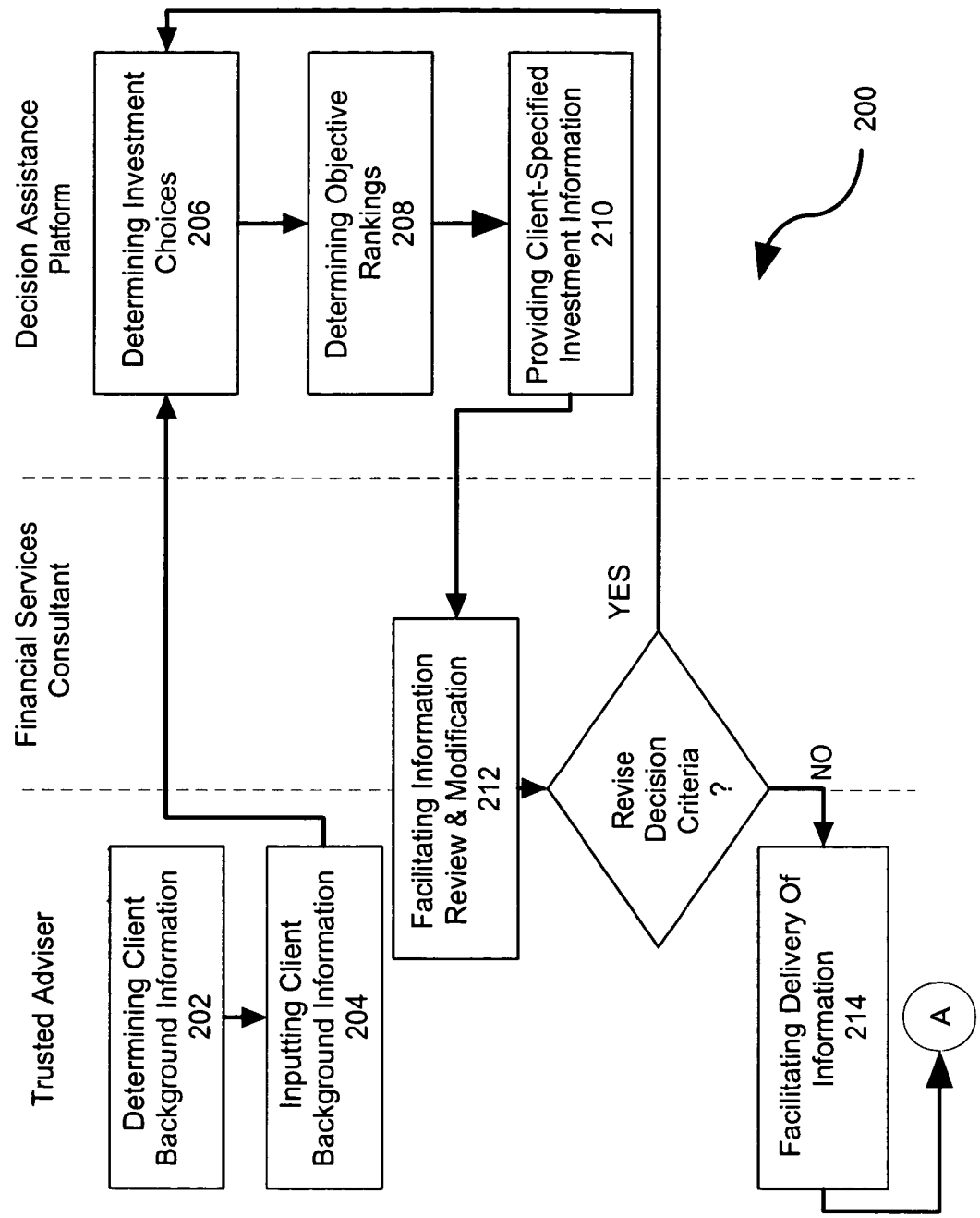

It is disclosed herein that a person may perform, in a manual fashion, certain decision assistance functionality disclosed herein as being facilitated by the decision assistance platform rather than such functionality being performed by the decision assistance platform. In one example, functionality of disclosed herein as being facilitated by the first decision engine of the decision assistance platform is at least partially facilitated by a person in a manual manner and resulting information is subsequently made available to the decision assistance platform for enabling functionality of the decision assistance platform to be facilitated (e.g., functionality facilitated by the second decision engine of the decision assistance platform). In one specific example, client-specific template information is at least partially generated in a manual manner rather than by a decision engine of the decision assistance platform FIGS. 2A and 2B depict a method 200 for facilitating financial consulting services in accordance with embodiments of the disclosures herein and in view of the information flow schematic 100 depicted in FIG. 1. An operation 202 is performed for obtaining client background information, such as in response to a meeting with the financial services client. After obtaining the client background information, an operation 204 is performed for inputting relevant and/or required client background information into a decision assistance platform. Inputting such information is an embodiment of enabling access of such information.

In response to inputting the client financial objectives, the decision assistance platform performs an operation 206 for determining investment choices (e.g., an appropriate asset allocation) that correspond to the client financial objectives. After determining the investment choices (e.g., asset allocation), the decision-assistance platform performs an operation 208 for determining an objective ranking (i.e., an objective quantification) of the computed investment choices (i.e., an operation that objectively scores and ranks, in a manner specific to that client, all available investment choices within the various asset classes of investment choices computed in operation 206), thereby producing objectively ranked investment choices. In at least one embodiment of the inventive disclosures made herein, determining the objective ranking includes objectively and client-specifically determining a performance score (discussed below in greater detail) for each of the investment choices and ranking the investment choices dependent upon information derived from the client-specific performance scores.

In one embodiment, determining the investment choices includes applying a logic conditional filter to at least one of potentially many performance and structural factors expressed as numeric information, alphanumerical information and/or date information. For example, such a conditional filter is used for omitting funds that are closed (i.e., not accepting investments from new investors), or that have other structural or situational characteristics (i.e., factors) that are not desired or appropriate (e.g., investment amount exceeds an investment amount prescribed) for a client. In one embodiment, determining investment choices includes determining the investment choices dependent upon information derived from different aspects of the client-specific template (i.e., different client-specific template information). Such determining is, in at least one embodiment of the inventive disclosures made herein, performed by a first decision engine of the decision-assistance platform, whereby resulting information compiled by the first decision engine is subsequently provided to the second decision engine of the decision-engine platform, thus enabling a scoring and ranking process to be carried out by the second decision engine. In one embodiment, the client-specific template include one or more of potentially many filters and weightings, with one or more of the filters and weightings being applied to performance factor information, client information, investment opportunity information, and/or investment performance information.

After determining the objective ranking, the decision assistance platform performs an operation 210 for providing client-specific consulting information (e.g., investment choices, objective quantification thereof, etc). In one embodiment, such providing the client-specific consulting information includes preparing and outputting a client-specific investment report by a document assembly engine of the decision-assistance platform. In another embodiment, such providing the client-specific consulting information includes visually displaying such information. Ion stall another embodiment, such providing includes making such information accessible for related operations (not necessarily or specifically shown) of the method 200. Accordingly, it is disclosed herein that the decision assistance platform is preferably configured for preparation and output of information as printed and/or electronic documents (i.e., reports that are configured for being printed and/or electronically displayed).

A client-specific investment report as disclosed herein documents client-specific consulting information such as objectively ranked investment choices. Such client-specific consulting information (e.g., objectively ranked investment choices) is, preferably, presented in view of multiple variables that are dependent upon information derived from the financial objectives of the client. For example, various scenarios of investment choices may be presented that are dependent upon information derived from a plurality of desired investment effects and related computed performance scores. Such investment effects are dependent upon information derived from performance criteria. Broadly, performance criteria in accordance with the inventive disclosures made herein include criteria relating to return, risk, associated industry-prescribed asset classes, investment effect rules and correlating investments opportunities to client expectations. Specific examples of performance criteria and their related performance factors are depicted below in Table 1. Detailed information defining such performance criteria and their related performance factors are not discussed in detail, but would be understood by a person skilled in the related art (e.g., financial systems and methodologies).

TABLE 1

Performance Criteria and related Performance Factors

| Performance Criteria | Related Performance Factors |
| --- | --- |
| Annualized Return | N-Year Return, N-Year Average Return |
| Annualized Standard Deviation | N Year Standard Deviation |
| Index | Index Score, Composite Index Score |
| Yield | N-Year Yield |
| Beta | N-Year Beta |
| Market Capitalization | Average Market Capitalization |
| Sharpe Ratio | N-Year Sharpe Ratio |
| Turnover Ratio | N-Year Turnover Ratio |
| Treynor Ratio | N-Year Treynor Ratio |

In at least one embodiment of the client-specific investment report, the client-specific investment report includes charts and tables depicting investment allocation among various asset classes, statistical/historical performance of investment choices within various asset classes, distribution of composite performance scores for such investment choices, and client-specific scoring and ranking of such investment choices. In at least one embodiment, the client-specific investment report includes a client-specific assessment of available investment alternatives dependent upon information derived from an assessment of such available investment alternatives.

After reviewing the client-specific consulting information, the trusted advisor and/or the financial services consultant (in consultation with the client) may facilitate an operation 212 for revising decision criteria upon which the objective ranking of investment choices is based. Such revisions include revisions to performance criteria (e.g., factor selections and weightings) and modifying/clarifying information associated with client financial objectives. In response to the trusted advisor and/or the financial services consultant revising any of the decision criteria, the method precedes at the operation 206 for determining investment choices an objective-ranking (i.e., operation 208) dependent upon information derived from the revised criteria. In response to neither the trusted advisor nor the financial services consultant revising any of the decision criteria, the method continues at an operation 214 for facilitating delivery of the client-specific consulting information (e.g., in the form of a client-specific investment report) to the financial services client (e.g., the trusted advisor initiating electronic submission of the information by the decision assistance platform or the trusted advisor personally facilitating presentation of the information). After the financial services client selects one or more investment choices into which funds are to be allocated (e.g., after consultation with the trusted adviser), an operation 216 is performed (e.g., by the trusted advisor or financial services client) for inputting the selected investment choices into the decision assistance platform. Once funds are allocated, the selected investment choices represent an investment portfolio of the financial services client.

Periodically (e.g., quarterly), an operation 218 is performed via the decision-assistance platform for facilitating a comparative performance assessment of the investment portfolio, thereby generating periodic performance information (i.e., client-specific decision information). As discussed below in greater detail, the comparative performance assessment provides information for qualitatively and objectively assessing selected investment choices. After facilitating the comparative performance assessment of the investment portfolio, the decision assistance platform performs an operation 220 for providing such client-specific decision information for subsequent operations. One example of enabling such subsequent operations includes outputting of a periodic performance report comprising such periodic performance information at the request of the trusted adviser. In one embodiment, the periodic performance report is prepared and outputted by a document assembly engine of the decision-assistance platform. After performing the operation 220 for providing such client-specific decision information, the trusted advisor performs an operation 222 for facilitating providing such information for review by the financial services client.

Preferably, a decision assistance platform as disclosed herein plays no role between the trusted advisor and the financial services client. However, in other embodiments, a decision assistance platform as disclosed herein does play a role between the trusted advisor and the financial services client. For example, the decision assistance platform may facilitate compilation of information directly from the financial services client or may provide investment choice information directly to the financial services client.

Figure 3:
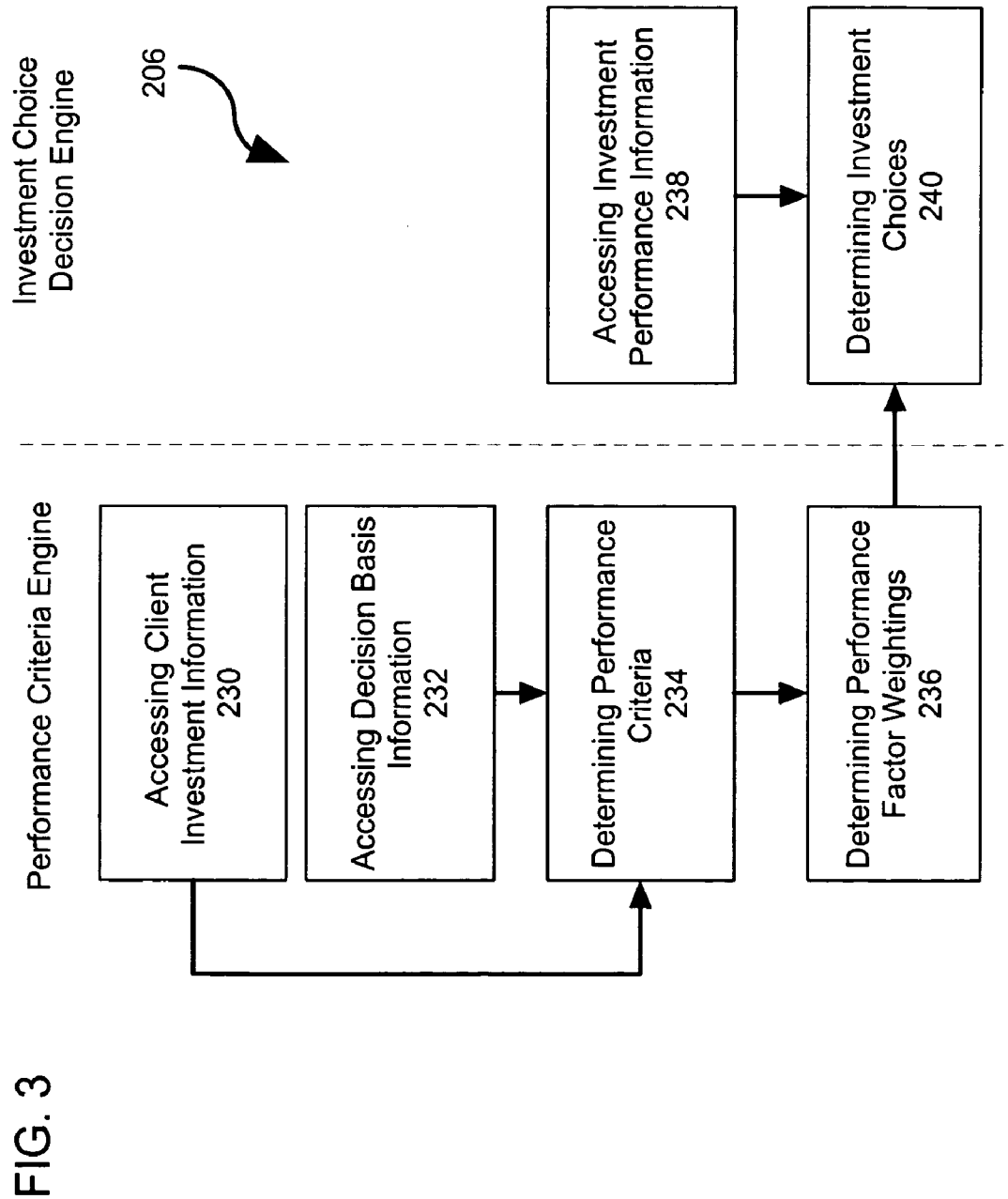
FIG. 3 depicts an embodiment of the operation for determining the investment choices depicted in FIG. 2.

FIG. 3 depicts an embodiment of the operation 206 for determining the investment choices. An operation 230 is performed by a performance criteria decision engine (i.e., a first decision engine) of the decision-assistance platform for accessing client background information and an operation 232 is performed by the performance criteria decision engine for accessing decision basis information. In one embodiment, client background information and decision basis information are accessed from one or more databases by the performance criteria decision engine.

In response to the client background information and the decision basis information being accessed, an operation 234 is performed via the performance criteria decision engine for determining corresponding performance criteria (e.g., investment effect parameters). Examples of the corresponding investment effect parameters include parameters associated with risk of an investment, parameters associated with return on an investment, parameters associated with other structural and performance aspects of an investment, various investment allocation rules and parameters associated with correlating investment opportunities to client financial expectations. In at least one embodiment, the category of investment effect parameters includes investment allocation parameters. The performance criteria decision engine performs an operation 236 for determining performance-weighting factors dependent upon information derived from the investment effect parameters in response to determining the investment effect parameters. For example, a performance factor weighting of 0.80 and 0.20 may be used to compute and apply performance factors for risk minimization and return maximization, respectively. The 0.80/0.20 performance factor weighting ratio would correspond to a situation in which the client financial objectives indicate that the client is far more concerned with risk minimization than return maximization.

After determining the performance factor weightings, an investment choice decision engine (i.e. a second decision engine) of the decision-assistance platform performs an operation 238 for accessing investment performance information (e.g., risk, return, and other structural and performance information), followed by the investment choice decision engine performing an operation 240 for determining investment choices dependent upon the client's individual investment needs, desires and/or goals. Preferably, the respective decision engines facilitate determining the performance selection and weighting factors, determining investment effect parameters, and determining an objective scoring and ranking of available investment choices without human intervention during the respective computation operations.

It is disclosed herein that functionality (e.g., operations) facilitated by the performance criteria decision engine (i.e., a first decision engine) of the decision-assistance platform may alternatively be facilitated manually by a person, rather than by the performance criteria decision engine. In such an embodiment, resulting information from the manually facilitated functionality is subsequently made available to the investment choice decision engine for enabling functionality of the investment choice decision engine to be facilitated.

Figure 4:
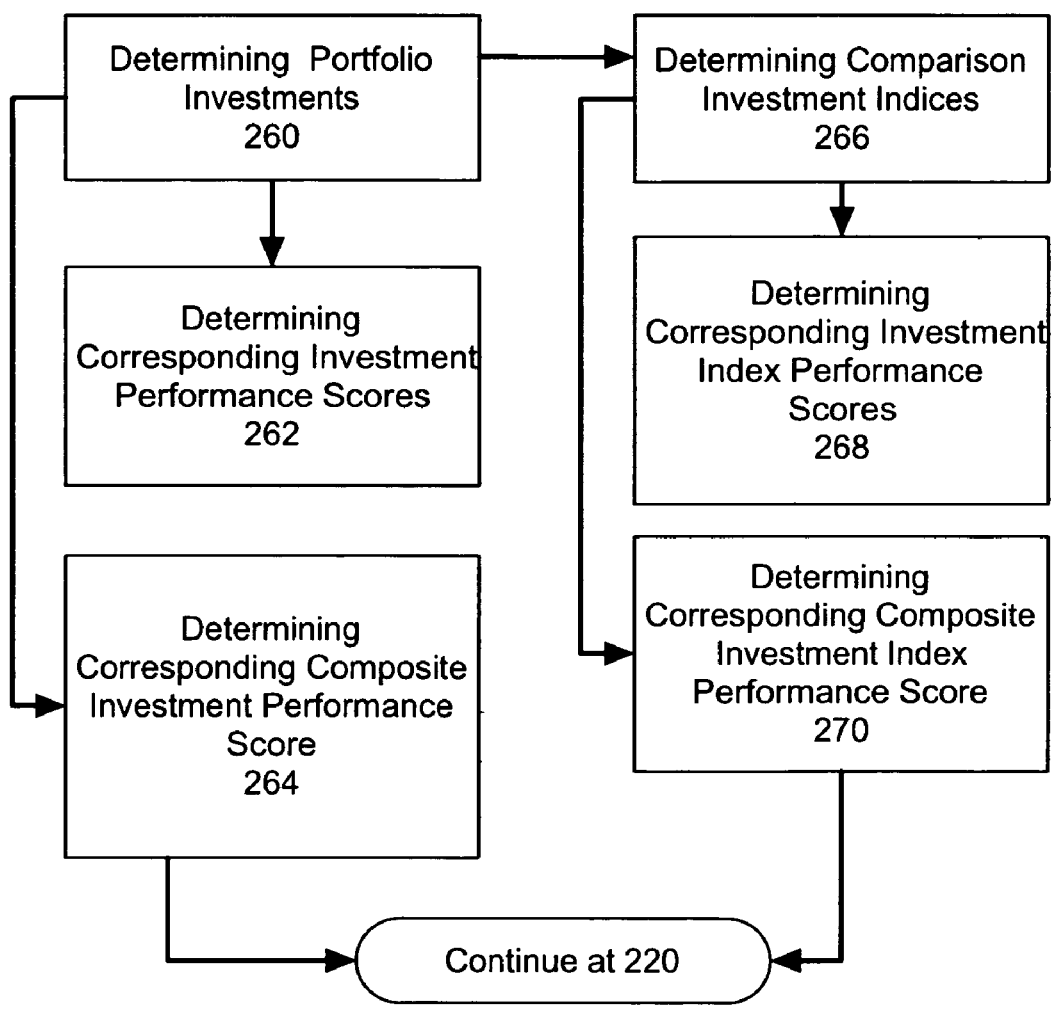
FIG. 4 depicts an embodiment of the operation for enabling the comparative performance assessment of the investment portfolio depicted in FIG. 2.

FIG. 4 depicts an embodiment of the operation 218 for performing the comparative performance assessment of the investment portfolio. An operation 260 is performed for determining portfolio investments (i.e., the investment choices that presently comprise the client's portfolio). In response to determining the portfolio investments, an operation 262 is performed for determining a corresponding investment performance score for each of the portfolio's individual investments and an operation 264 is performed for determining a corresponding composite investment performance score. The composite investment performance score is a composite score that represents an overall performance of all of the individual portfolio investments.

After the portfolio investments are determined, an operation 266 is performed for determining comparison investment indices corresponding to each one of the portfolio investments. The comparison investment indices are those indices that suitably correspond to each of the portfolio investments (e.g., within a corresponding asset class, exhibiting corresponding performance factors, etc). In response to determining the comparison investment indices, an operation 268 is performed for determining a corresponding investment index performance score for each of the comparison investment indices and an operation 270 is performed for determining a corresponding composite investment index performance score. The composite investment index performance score is a composite score that represents an overall performance of all of the individual investment indices. These individual and composite investment index performance scores are computed in the same manner (i.e., using the same performance factors and the same performance factor weightings) as is used in operations 262 and 264 described above. After determining the various performance scores, the operation 220 (FIG. 2B) is performed for providing such information for associated operations (e.g., for printing and/or displaying such periodic performance information).

It is contemplated that determining the composite investment index performance score may include combining the respective investment index indices dependent upon information derived from actual allocations of funds within the corresponding investment portfolio and/or upon at least one of criteria relating to risk and criteria relating to return. Similarly, it is contemplated that determining the composite investment performance score may include combining the respective portfolio investments dependent upon information derived from actual allocations of funds within the corresponding investment portfolio and/or upon at least one of criteria relating to risk and criteria relating to return. Furthermore, it is disclosed herein that a decision engine system of the decision assistance platform and/or a document assembly engine of the decision assistance platform may perform the functionality of the operation steps of 218 for performing the comparative performance assessment of the investment portfolio.

Accordingly, scoring and ranking of all available investment choices within each asset class within the client's portfolio is performed. The scoring and ranking is performed using the same performance parameters and parameter weightings used in the original scoring and ranking analysis used by the client to select the clients investment choices. The various related investment indices are scored and ranked in exactly the same manner as the investment choices within the asset class for which a particular index is relevant. The scoring process produces a composite numerical score for each of the client's investment choices, all other available (yet unchosen) investment choices, and the relevant indices.

These numeric scores, when used to sort the results of the scoring (e.g., from the highest composite score to the lowest composite score), effectively and quantitatively compare all investment choices with each asset class (both chosen and unchosen) as well as the relevant indices. The highest scoring and, therefore, the highest ranking of the choices are those whose blended composite score (i.e., the score resulting from the blending of all of the individually weighted performance factors used in the scoring process) indicate those choices that the historic performance which most closely matches the investment performance desired by the client for a particular asset class being evaluated (i.e., the performance desired of that asset class, which was the reason for the inclusion of that asset class in the portfolio).

It is disclosed herein that the investment indices may correspond to asset classes corresponding to the individual portfolio investments. In such case, it is contemplated that performing the comparative performance assessment is performed between allocated investment (i.e., those selected investment choices that are funded) and a plurality of non-allocated investments represented by the asset class (i.e., all or a portion of the investment choices that were not selected for being funded).

FIG. 5 is a chart 300 depicting a graphical representation of performance scores that are depicted in view of corresponding asset classes 301. In one example, the chart 300 is comprised by a periodic performance report. The composite performance score 302 for each one of the asset classes 303 within the portfolio is depicted by a first configuration of graphical indicia (e.g., a corresponding horizontal bar of a first color). Depicted in association with individual managers and/or funds 304 is a composite score 305. The performance score 306 of each one of the investment indices 308 is depicted by a second configuration of graphical indicia (e.g., a discrete symbol of a first color) superimposed over the first configuration of graphical indicia. The composite investment performance score 310 is depicted by a third configuration of graphical indicia ((e.g., a corresponding vertical bar of a second color). The composite index score 312 is depicted by a fourth configuration of graphical indicia (e.g., a triangle) superimposed over the third configuration of graphical indicia. In this manner, the selected investment choices of the financial services client are graphically compared to appropriate benchmarks.

The chart 300 of FIG. 5 is configured to provide a summary of portfolio performance, using bar graphs to represent scores resulting from an assessment of the individual funds comprising the portfolio as well as the portfolio as a whole. The chart 300 provides a means for measuring overall portfolio performance, by comparing the "Composite Portfolio" score (i.e., the bar adjacent to the term "Composite") with the "Composite Index" score (i.e., the triangle superimposed on the bar adjacent to the term Composite). As depicted, the composite portfolio bar extends beyond the location of the composite index triangle. The positive differential indicated that the Composite Portfolio is outperforming the Composite Index in meeting stated performance goals. The chart 300 similarly depicts the performance of individual portfolio investments in relation to individual composite index components.

The graphical representation of the composite index score 310 is proportional to a blended score (i.e., discussed in the following paragraph in greater detail) of the portfolio and is positioned along a performance scale 311 such that its score can be compared to the composite index score 312 of the investment portfolio as a whole. The performance scale 311 serves as a means for measuring performance (e.g., scores) based on relative position of graphical representations depicting such scores. The graphical representation of each asset class performance score 302 is proportional to the composite score of individual fund (or manager) and is positioned the performance scale 311 such that its each performance score 302 can be compared to its fund's relevant index score 306. The graphical representation of a fund's relevant composite score index score 306 represents the performance of the respective fund.

The composite performance scores 302 for each individual fund and related asset class 303 provide a summary of the performance assessment performed on each of the portfolios asset classes. Additionally, blending of the performance scores of the individual funds held is used in determining the composite investment performance score 310. The scores of relevant indices 308 are similarly blended and used in determining the composite index score 312. In one embodiment, such blending is accomplished by using current market value of individual manager's holdings and the proportional percentage of those holdings with respect to the total value of the portfolio. For example, in an instance where the value of the manager's holdings were $5,000,000 and the total portfolio value were $100,000,000, 5% of the composite portfolio score 302 would be attributed to the composite investment score of that manager. Furthermore, the same proportion of 5% would apply to the manager's relevant index score and the blending determination of the composite index score.

Performance of a fund and its manager is typically considered within the context of a specific performance factor. For example, 5-year average return could be sorted to find out which manager had the highest return over a five-year period. However, when multiple performance factors (i.e., performance criteria used for decision making purposes) are used simultaneously to evaluate a manager's performance, the combining of each factor's performance is done in a manner that produces a composite score that can be used to evaluate the manager's/fund's overall performance. Once multiple performance criteria (which are functionally used as decision criteria) are selected, individual weightings can be assigned to each of the performance criteria so that the overall manager performance can be defined to the specific performance and decision requirements (e.g., needs, goals, risk tolerances, etc) of the investor (i.e., the financial services client). Having a visual representation of how weighted performance criteria impact the composite scores is useful for quickly identifying which decision criteria are having the most impact on the composite scores.

The chart 314 of FIG. 6A and the table 316 of FIG. 6B jointly depict an alternate embodiment for presenting the information depicted in the chart 300 of FIG. 5. While essentially the same information is presented in FIG. 5 as jointly depicted in FIGS. 6A and 6B, presentation in accordance with the chart of FIG. 5 is advantageous in that it allows a greater volume of information to be presented in a given amount of space (i.e., with respect to the presentation approach of FIGS. 6A and 6B).

It is disclosed herein that the charts depicted in FIGS. 5, 6A and 6B are examples of information configured for enabling objective and comparative assessment of investment choices to be made by an investor/financial services client. It is also disclosed herein that operations and/or approaches for generating all or a portion of the information comprised by the charts depicted in FIGS. 5, 6A and 6B are examples of assessing such information and/or enabling comparative assessment of such information.

FIG. 7 depicts a table 325 having a plurality of multi-segment bars 327 (e.g., bars with different color segments) that each graphically represents a corresponding composite score. The lengths of each multi-segment bar 327 is proportional to its corresponding composite score 329 and, for comparison purposes, relative to all of the composite scores shown. The various segments 330 of each bar 327 represent the relative performance of the corresponding weighted performance criteria. The length of each segment 330 represents a performance criteria's weighted performance, as compared against a group of its peers within the same asset class. Longer segments proportionally represent a larger impact on the composite score. The order of the segments of each bar match the display order of the performance criteria labels 331 (e.g., 5-year return) in the header section of the table 325. However, in certain instances, a particular segment of a particular bar will not be depicted, representing that a manager is either missing data for the corresponding performance criteria or that a combination of minimal weighting and/or poor performance has cause that performance criteria to have little to no impact on the corresponding composite score.

Relative performance of performance criteria (i.e., criteria utilized for making investment decisions) in accordance with the inventive disclosures made herein may be assessed relative to one or more points of reference. Relative performance of decision criteria against all peers is a first point of reference. For example, comparing the length of the 5-Year Average Return segments in the Table 325 of FIG. 7 indicates roughly a 35% difference in length favoring the top rated manager, which is translated to same difference in performance as it relates to its peer group. Performance as it relates to the peer group is calculated using a scale of 5-Year Average Return values. All of the performance criteria's peers define this scale and each performance score is applied to that scale to find it's relative rank within the group. Because the graphical representation of performance takes each performance criteria's scale into consideration, it is useful for comparing performance of performance criteria scores quickly. Thus, large differences in performance between managers can be identified easily.

Relative performance of the performance criteria as it relates to the composite performance score is a second point of reference. Performance criteria weightings are not mentioned when evaluating the relative performance of performance criteria relative to all bears. This is because the weighting assigned to each performance criteria is applied equally to the group of peers. However, the weightings assigned to each performance criteria directly influence determination of the composite score. For example, comparing the length of all the segments for the top manager shows that the majority of the weighting has been placed on the 5-Year Return and 5-Year Standard Deviation. For this example, 80% of the weighting is placed on the combination of those two performance criteria, which means that on a composite scoring scale of 0 to 10, these two performance criteria can add as much as 8 points to the composite score. Unlike the 5-Year performance criteria, the combined weightings of the 3-Year Return and 3-Year Standard Deviation are only weighted at 17.5%, which can add as much as 1.75 points to the composite score. The weighting assigned to each performance criteria acts as a multiplier that defines the maximum impact that the performance criteria can have one the composite score and also the maximum length of the corresponding segment of the bar in Table 2. The effect of the weighting can be seen easily by comparing the sizes of the 5-Year performance criteria to the 3-Year performance criteria.

FIG. 8A depicts an embodiment of a weighting approach 335 for facilitating a performance assessment in accordance with the inventive disclosures made herein. The weighting approach 335 depicts a manner in which a performance assessment of managers is performed within each of the asset classes and shows a relationship of performance characteristics and performance criteria that have been used. The multi-segment vertical bar 337 depicts a grouping of performance criteria 339 used in the assessment and the degree of influence (i.e., weighting) assigned to each. Each one of the performance criteria 339 of the vertical bar 337 has one or more subtending performance factors 341 associated therewith. The performance factors 341 that relate to common performance criteria 339 subtend from that particular performance criteria 339, thus producing groupings of performance factors in some instances.

Weightings are individually assigned to the performance factors 341 and indicate how much influence each of the performance factors 341 has within its group. Increasing any one performance factor's weighting within a group results in a corresponding degrease in the weighting assigned to the one or more other performance factors in the group. In effect, the sum of all of the performance factor weightings within a group must always sum to 100%. The same applies to the sum of all of the weightings applied to the performance criteria 339 from which all of the performance factors 341 subtend.

Weighting of the various performance criteria 339 and performance factors 341 influence performance scores referred to herein. Specifically, each grouping of performance scores has a direct effect on a performance score. Because a 50% weighting has been applied to one of the performance criteria 339, that performance criteria will control 50% of a performance scale (e.g., 5 points of the 10-point scale). The individual performance factors 341 subtending from each performance criteria 339 have an indirect affect upon the performance score. That indirect affect is determined by multiplying the weight assigned to that performance factor 341 and the weight of the performance criteria 339 from which it subtends.

FIGS. 8B and 8C depict an embodiment of a hierarchical weightings structure that represents an approach for utilizing the weightings for determining performance scores. In effect, the weighting structure depicted in FIGS. 8B and 8C and the weighting approach 330 depicted in FIG. 8A accomplish the same objective and produce the same type of information. The difference is simply a matter of presentation.

The hierarchical structure includes a tree structure 350 where nodes 352 of the tree structure 350 are either classes or performance factors (depicted as 'factor' in FIGS. 8B and 8C). The tree structure 350 serves to distribute weightings to the performance factors. The weightings assigned to the performance factors define the potential impact that a performance factor may have on the scoring and ranking performed during an assessment (e.g., the comparative performance assessment discussed above) of investment information.

Performance factors are the 'leaves' of the tree and correspond directly to the performance data recorded in a corresponding dataset (i.e., investment performance information). Performance factors are always an end node 354 of any branch in the tree 350. As depicted in FIG. 8B, 'Class 1A' is a parent class node to 'Factor 2' (i.e., a child class node to 'Class 1A'), it is itself a child class node to 'Class 1' (i.e., the parent class node of 'Class 1A') and it is a sibling class node to 'Factor 1' and 'Class 1B' (i.e., the sibling class nodes of 'Class 1A').

Classes are a group of performance factors or some combination of performance factors and classes. Only classes may be parent class nodes, but they can also be child class nodes or sibling class nodes. Factors may never be parent class nodes, and may only be child class nodes or sibling class nodes. Nodes on the same hierarchal level that are assigned to the same parent class node, will add up to 100%. Or, if they do not add to 100%, they are reduced to sum up to 100% while maintaining the weighting relationship between the assigned performance factors and classes. The performance factors that are assigned to classes are typically similar or share some common theme. The purpose of the classes is to have a way to influence the relative weightings of all the subtending classes and performance factors that have a relationship to a parent class.

All nodes 352 within the tree 350 have an assigned and/or a calculated weight. These weights can be assigned via a template, by manual entry or, though some other type of decision process (e.g., that of the performance criteria decision engine disclosed herein). It is necessary to normalize the weightings of all of the nodes 352 to 100%, so that their weightings are relative to subtending parent class nodes. Once normalized into a relative weighting, an actual weighting can be calculated for each of the class nodes.

As depicted in FIG. 8C, actual weights are calculated based on the relative weightings of the nodes 352 in the weightings hierarchy. Actual weightings influence the scoring and ranking that takes place during an assessment of investment information. Each nodes relative weight is multiplied by the actual weight of its parent node, which produces the actual weight of each one of the nodes 352. The hierarchy is processed from the highest node in the tree 350 to the lowest nodes in the tree, because the actual weight of parent class nodes is required to calculate the actual weight of its children (i.e., child class nodes). The actual weightings are then applied to investment performance data to generate a corresponding factor performance score. These individual factor performance scores are then combined to produce a composite performance score.

Using a hierarchical weighting structure is advantageous in that it enables the effect of different weighting scales to be blended. Blending such scales through the use of weighting allows evaluation of performance factor values using various different scoring methods. For example, though such blending, blended investment index performance scores and a corresponding blended composite investment index performance score may be computed. As depicted in FIG. 8C, blended tree fragments 355 represent a plurality of performance factor weightings that sum to the weighting of a respective parent node 356.

FIG. 9 depicts a network system 400 (i.e., a data processing system) configured for facilitating financial consulting services functionality in accordance with embodiments of the inventive disclosures made herein. The system 400 includes a decision-assistance platform 402, a network interface device 404 coupled to the decision-assistance platform 402, a network system 406 coupled to the network interface device 404. The decision assistance platform 402 comprises a database structure 407 accessible by the decision-assistance platform 402. Accordingly, communication of information between the decision-assistance platform 402 and other entities (e.g., a computer of a client, a computer of a financial services consultant, a computer capable of downloading investment performance information, etc) is enabled and accessibility of information required for carrying out such financial consulting services functionality is enabled (e.g., via accessing a website from which such functionality is accessible).

The decision-assistance platform 402 includes a performance criteria decision engine 408 (i.e., a first decision engine), an investment choice decision engine 410 (i.e., a second decision engine) and a document assembly engine 412. The performance criteria decision engine 408 is an example of a means for carrying out performance weighting factor computation functionality as disclosed herein. Such computation of performance weighting factors may include information comprised by the client-specific template (e.g., logic conditional filters and/or processing instructions).

In at least one embodiment of the inventive disclosures made herein, the first decision engine is configured for facilitating initial allocation functionality (e.g., facilitating appropriate client-specific allocations of investments and investment effect parameters). The investment choice decision engine 410 is an example of a means for carrying out comparative scoring and ranking (i.e., quantification) of investment choices computation functionality as disclosed herein. A decision engine system of a decision assistance platform is defined herein to comprise the performance criteria decision engine and the investment choice decision engine. The document assembly engine 412 is an example of a means for carrying out document preparation/outputting functionality as disclosed herein. It is contemplated that the various engines may be physically embodied as separate or fully integrated software/hardware modules.

The database structure 407 includes a decision information database (which may include rules set) 414, an investment performance information database 416, and a client information and document layout information database 418. In at least one other embodiment, separate client information and document layout information databases are provided. Information (e.g., rules) upon which the decision assistance platform 402 is dependent for carrying out performance criteria decision functionality as disclosed herein is maintained in the decision information database 414. Information upon which the decision assistance platform 402 is dependent for carrying out scoring and ranking computation functionality (i.e., of investment choices) as disclosed herein is maintained in the investment performance information database 416. Information upon which the decision assistance platform 402 is dependent for carrying out document preparation/outputting functionality as disclosed herein is maintained in the client information and document layout information database 418.

It is disclosed herein that, in at least one embodiment of the inventive disclosures made herein, the decision assistance platform 402 is not a physically distinct apparatus or system. Rather, in such at least one embodiment, the decision assistance platform 402 is a functional platform comprised by functionality imparted across a plurality of systems or system components (e.g., discrete functional blocks linked via a network system). Accordingly, it is disclosed herein that system elements configured for imparting such functionality may be or may not be located at a common location and may or may not reside on a common computer.

It is disclosed herein that, in at least one embodiment of the inventive disclosures made herein, the decision assistance platform 402 comprises a single decision engine (e.g., a single data processing program) configured for facilitating all or a portion of the functionality of the 408, an investment choice decision engine 410 and a document assembly engine 412. In one example, a single decision engine program running on a suitable data processing system facilitates all or a portion of the functionality of the 408, an investment choice decision engine 410 and a document assembly engine 412 via a single data processing program. In another example, a single decision engine is fashioned to include various functional modules that interact to facilitate all or a portion of the functionality of the 408, an investment choice decision engine 410 and a document assembly engine 412.

Referring now to computer readable medium in accordance with embodiments of the inventive disclosures made herein, methods as disclosed herein are tangibly embodied by computer readable medium having instructions thereon for carrying out such methods. In one specific example, instructions are provided for carrying out the various operations of the method 100 depicted in FIGS. 2A and 2B for facilitating financial consulting services. The instructions may be accessible by the decision-assistance platform from a memory apparatus of the decision assistance platform (e.g. RAM, ROM, virtual memory, hard drive memory, etc), from an apparatus readable by a drive unit of the decision assistance platform (e.g., a diskette, a compact disk, a tape cartridge, etc) or both. Examples of computer readable medium include a compact disk or a hard drive, which has imaged thereon a computer program for carrying out financial consulting services functionality in accordance with embodiments of the inventive disclosures made herein.

Although the discussion of method and systems in accordance with embodiments of the inventive disclosures made herein have been presented thus far in view of financial utility to investors, it is contemplated that such methods and systems may be configured specifically for providing utility in the areas of commercial and residential lending, venture capital funding, investment banking services. Furthermore, it is contemplated that such methods and systems may be configured for providing utility beyond financial services. Specifically, embodiments of the decision-assistance platform functionality disclosed herein may be applied in applications other than financial services. Retail e-commerce applications, market research applications, human resource applications, dating services and raw material procurement are examples of such applications where an objective and unbiased scoring and ranking assessment of all available choices (i.e., within any universe of choices, the differences among them which may be quantified) functionality, consistent with a client's (or consumer's) individual needs, goals and/or desires, provided by the decision-assistance platform functionality are useful.

The inventive disclosures made herein relate to facilitating financial consulting services. Methods and equipment in accordance with embodiments of the inventive disclosures made herein are configured for enabling quantitatively ranked investment choices to be offered to clients by trusted advisers (e.g., attorneys, lawyers, siblings, community bankers, and the like) who are not necessarily professionals within the traditional financial services industry. The trusted advisor is thus armed with the knowledge to coordinate all of their clients' financial services needs, not as product salespeople, but in their traditional role as the providers of independent advice. In doing so, the client is provided with an increased level of trust with respect to the financial information being provided and the person providing the financial information.

Methods in accordance with embodiments of the inventive disclosures made herein and system configured for carrying out such methods provide trusted advisors having access to such methods (i.e., affiliated trusted advisors) with a proprietary support arrangement including a decision assistance platform. The proprietary decision assistance platform enables the affiliated trusted advisors to advise their clients and to coordinate solutions to their needs, outsourcing the responsibility of product research, comparative assessment, implementation and acquisition. This unique outsourcing structure creates significant efficiencies and allows affiliated trusted advisors to largely confine their time to meeting with and advising their clients, which is the most important and best use of their time. It eliminates the need to refer clients away to brokers, insurance agents, and other product salespeople, allowing the affiliated trusted advisor to retain a large portion of revenues that they have traditionally referred away to such brokers, agents and salespeople.

Furthermore, methods and systems in accordance with embodiments of the inventive disclosures made herein are designed to address a number of increasingly important and troubling trends that both consumers and professional advisory firms are now facing. The growing complexity and range of available choices is creating increasing uncertainty and stress among clients and their advisors (i.e., those individuals trying to help them make informed decisions with regard to product selection), and is increasing the need for unbiased, trustworthy advice. As the range of available choices continues to proliferate and as the volume and complexity of information about them continues to grow, many investors simply do not have the time to become knowledgeable about what their choices are, much less having the time and the ability to confidently choose from among them. In essence, many investors no longer have the time or individual ability to be able to discern what is truly "best" for them and their families relative to investment choices.

With rapidly expanding access to an increasingly diverse array of financial products and service choices—as well as increasingly voluminous and complex information about such choices—consumers increasingly need help in objectively analyzing the universe of available investment choices in order to feel secure that they have done "the best" for themselves and their families. Embodiments of the inventive disclosures made herein provide solution to increasingly broad needs for objective, trustworthy advice. The significance of this solution will continue to grow in parallel with the growth and development of the knowledge-based economy and e-commerce. With proper methodologies, training, technological tools and support, affiliated trusted advisors who already possess the greatest degree of client trust will be able to successfully meet this expanding client need for more broad ranging, objective advice with respect to financial products.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A system for objectively quantifying investment choices, comprising:

at least one data processing device;

instructions processable by said at least one data processing device; and an apparatus from which said instructions are accessible by said at least one data processing device;

wherein said instructions are configured for causing said at least one data processing device to:

provide a hierarchical weighting structure including a plurality of performance criteria and a plurality of performance factors selected to provide a desired investment effect, wherein a first group of said performance factors subtends from a first one of said performance criteria, a second group of performance factors subtends from a second one of said performance criteria, the plurality of performance criteria comprises at least risk and return associated with said investment choices, and the plurality of performance factors are at least time-based measurements of said performance criteria;

provide a relative weighting value for each one of said performance criteria and for each one of said performance factors selected to provide the desired investment effect;

provide a plurality of investment choices on which to perform a comparative assessment;

provide a performance factor value corresponding to each one of said performance factors for each one of said investment choices;

generate a score for each one of said performance factors for each one of said investment choices, wherein the score for each one of said performance factors is derived from the corresponding one of said performance factor values and the corresponding relative weighting value;

derive a composite investment performance score from said performance factor scores and the corresponding relative weighting value for each one of said performance criteria for each one of said investment choices; and provide a comparative assessment for the plurality of investment choices at least partially based on the composite investment performance scores.

2. The system of claim 1 wherein said instructions are further configured for causing said at least one data processing device to:

rank each one of said investment choices based on the composite investment performance score.

3. The system of claim 1 wherein the hierarchical weighting structure is configured in a manner for causing a first one of said performance factor values to be quantified based on a first quantitative scoring scale and a second one of said performance factors to be quantified based on a second quantitative scale different than the first quantitative scoring scale.

4. The system of claim 3 wherein:

the hierarchical weighting structure includes a plurality of parent class nodes and at least one of a performance factor and a child class node subtending from at least one of said parent class nodes; and said nodes are configured in a manner for causing the first one of said performance factor values to be quantified based on the first quantitative scoring scale and the second one of said performance factors to be quantified based on the second quantitative scale different than the first quantitative scoring scale.

5. The system of claim 4 wherein each one of said parent class nodes comprises at least one of a plurality of performance factors and a combination of at least one performance factor and at least one child class node.

6. The system of claim 1 wherein said instructions are further configured for causing said at least one data processing device to:

determine a collection of indices, wherein each one of said indices corresponds to a respective investment within an investment portfolio; and determine a composite investment index performance score for each one of said indices in the same manner as the composite investment performance score for each one of said investment choices is determined such that the hierarchical weighting structure and weighting values thereof used in determining the composite investment performance score for each one of said investment choices is used in determining the composite investment index performance score for each one of said indices.

7. The system of claim 1 wherein said instructions are further configured for causing said at least one data processing device to:

determine an asset class corresponding to an allocated investment within an investment portfolio; and perform a comparative performance assessment between the allocated investment and a plurality of non-allocated investments represented within the asset class.

8. A method for objectively quantifying investment choices, comprising:

at least one data processing device of a data computing system accessing, from memory coupled to said at least one data processing device, instructions causing said at least one data processing device to provide a hierarchical weighting structure including a plurality of performance criteria and a plurality of performance factors selected to provide a desired investment effect, wherein a first group of said performance factors subtends from a first one of said performance criteria, a second group of performance factors subtends from a second one of said performance criteria, the plurality of performance criteria comprises at least risk and return associated with said investment choices, and the plurality of performance factors are at least time-based measurements of said performance criteria;

said at least one data processing device accessing, from said memory, instructions causing said at least one data processing device to provide a relative weighting value for each one of said performance criteria and for each one of said performance factors selected to provide the desired investment effect;

said at least one data processing device accessing, from said memory, instructions causing said at least one data processing device to provide a plurality of investment choices on which to perform a comparative assessment;

said at least one data processing device accessing, from said memory, instructions causing said at least one data processing device to provide a performance factor value corresponding to each one of said performance factors for each one of said investment choices;

for each one of said investment choices said at least one data processing device accessing, from said memory, instructions causing said at least one data processing device to generate a score for each one of said performance factors for each one of said investment choices, wherein the score for each one of said performance factors is derived from the corresponding one of said performance factor values and the corresponding relative weighting value;

said at least one data processing device accessing, from said memory, instructions causing said at least one data processing device to derive a composite investment performance score from said performance factor scores and the corresponding relative weighting value for each one of said performance criteria for each one of said investment choices; and said at least one data processing device accessing, from said memory, instructions causing said at least one data processing device to provide a comparative assessment for the plurality of investment choices at least partially based on the composite investment performance scores.

9. The method of claim 8, further comprising said at least one data processing device accessing, from said memory, instructions causing said at least one data processing device to rank each one of said investment choices based on the composite investment performance score.

10. The method of claim 8 wherein the hierarchical weighting structure is configured in a manner for causing a first one of said performance factor values to be quantified based on a first quantitative scoring scale and a second one of said performance factors to be quantified based on a second quantitative scale different than the first quantitative scoring scale.

11. The method of claim 10 wherein:

the hierarchical weighting structure includes a plurality of parent class nodes and at least one of a performance factor and a child class node subtending from at least one of said parent class nodes; and said nodes are configured in a manner for causing the first one of said performance factor values to be quantified based on the first quantitative scoring scale and the second one of said performance factors to be quantified based on the second quantitative scale different than the first quantitative scoring scale.

12. The method of claim 11 wherein each one of said parent class nodes comprises at least one of a plurality of performance factors and a combination of at least one performance factor and at least one child class node.

13. The method of claim 8, further comprising:
said at least one data processing device accessing, from said memory, instructions causing said at least one data processing device to determine a collection of indices, wherein each one of said indices corresponds to a respective investment within an investment portfolio; and
said at least one data processing device accessing, from said memory, instructions causing said at least one data processing device to determine a composite investment index performance score for each one of said indices in the same manner as the composite investment performance score for each one of said investment choices is determined such that the hierarchical weighting structure and weighting values thereof used in determining the composite investment performance score for each one of said investment choices is used in determining the composite investment index performance score for each one of said indices.

14. The method of claim 8, further comprising
said at least one data processing device accessing, from said memory, instructions causing said at least one data processing device to determine an asset class corresponding to an allocated investment within an investment portfolio; and
said at least one data processing device accessing, from said memory, instructions causing said at least one data processing device to perform a comparative performance assessment between the allocated investment and a plurality of non-allocated investments represented within the asset class.

15. The method of claim 8, further comprising:
said at least one data processing device accessing, from said memory, instructions causing said at least one data processing device to rank each one of said investment choices based on the composite investment performance score.

16. A system for objectively quantifying investment choices, comprising:
at least one data processing device;
instructions processable by said at least one data processing device; and
an apparatus from which said instructions are accessible by said at least one data processing device;
wherein said instructions are configured for causing said at least one data processing device to:
provide a hierarchical weighting structure including performance criteria and performance factors selected to provide a desired investment effect, wherein a first group of said performance factors subtends from a first one of said performance criteria, a second group of performance factors subtends from a second one of said performance criteria, the plurality of performance criteria comprises at least risk and return associated with said investment choices, the plurality of performance factors are at least time-based measurements of said performance criteria, and the weighting structure is configured in a manner for causing a first one of said performance factor values to be quantified based on a first quantitative scoring scale and a second one of said performance factors to be quantified based on a second quantitative scale different than the first quantitative scoring scale;
provide a relative weighting value for each one of said performance criteria and for each one of said performance factors selected to provide the desired investment effect;
provide a plurality of investment choices to be ranked;
provide a performance factor value corresponding to each one of said performance factors for each one of said investment choices;
generate a score for each one of said performance factors for each one of said investment choices wherein the score for each one of said performance factors is derived from the corresponding one of said performance factor values and the corresponding relative weighting value;
derive a composite investment performance score from said performance factor scores and the corresponding relative weighting value for each one of said performance criteria for each one of said investment choices; and
rank each one of said investment choices based on the composite investment performance score.

17. The system of claim 16 wherein:
the a hierarchical weighting structure including a plurality of parent class nodes and at least one of a performance factor and a child class node subtending from at least one of said parent class nodes; and
said nodes are configured in a manner for causing the first one of said performance factor values to be quantified based on the first quantitative scoring scale and the second one of said performance factors to be quantified based on the second quantitative scale.

18. The system of claim 17 wherein each one of said parent class nodes comprises at least one of a plurality of performance factors and a combination of at least one performance factor and at least one child class node.

19. The system of claim 16 wherein said instructions are configured for causing said at least one data processing device to:
determine a collection of indices, wherein each one of said indices corresponds to a respective investment within an investment portfolio; and
determine a composite investment index performance score for each one of said indices in the same manner as the composite investment performance score for each one of said investment choices is determined such that the hierarchical weighting structure and weighting values thereof used in determining the composite investment performance score for each one of said investment choices is used in determining the composite investment index performance score for each one of said indices.

20. The system of claim 16 wherein said instructions are configured for causing said at least one data processing device to:
determine an asset class corresponding to an allocated investment within an investment portfolio; and
perform a comparative performance assessment between the allocated investment and a plurality of non-allocated investments represented within the asset class.

21. A method for objectively quantifying investment choices, comprising:
at least one data processing device of a data computing system accessing, from memory coupled to said at least one data processing device, instructions causing said at least one data processing device to provide a hierarchical weighting structure including performance criteria and performance factors selected to provide a desired investment effect, wherein a first group of said performance factors subtends from a first one of said performance criteria, a second group of performance factors subtends from a second one of said performance criteria, the plurality of performance criteria comprises at least risk and return associated with said investment choices, the plurality of performance factors are at least time-based measurements of said performance criteria, and the weighting structure is configured in a manner for causing a first one of said performance factor values to be quantified based on a first quantitative scoring scale and a second one of said performance factors to be quantified based on a second quantitative scale different than the first quantitative scoring scale;

said at least one data processing device accessing, from said memory, instructions causing said at least one data processing device to provide a relative weighting value for each one of said performance criteria and for each one of said performance factors selected to provide the desired investment effect;

said at least one data processing device accessing, from said memory, instructions causing said at least one data processing device to provide a plurality of investment choices to be ranked;

said at least one data processing device accessing, from said memory, instructions causing said at least one data processing device to provide a performance factor value corresponding to each one of said performance factors for each one of said investment choices;

said at least one data processing device accessing, from said memory, instructions causing said at least one data processing device to generate a score for each one of said performance factors for each one of said investment choices, wherein the score for each one of said performance factors is derived from the corresponding one of said performance factor values and the corresponding relative weighting value;

said at least one data processing device accessing, from said memory, instructions causing said at least one data processing device to derive a composite investment performance score from said performance factor scores and the corresponding relative weighting value for each one of said performance criteria for each one of said investment choices; and said at least one data processing device accessing, from said memory, instructions causing said at least one data processing device to rank each one of said investment choices based on the composite investment performance score.

22. The method of claim 21 wherein each one of said parent class nodes comprises at least one of a plurality of performance factors and a combination of at least one performance factor and at least one child class node.

23. The method of claim 21, further comprising:
said at least one data processing device accessing, from said memory, instructions causing said at least one data processing device to determine a collection of indices, wherein each one of said indices corresponds to a respective investment within an investment portfolio; and said at least one data processing device accessing, from said memory, instructions causing said at least one data processing device to determine a composite investment index performance score for each one of said indices in the same manner as the composite investment performance score for each one of said investment choices is determined such that the hierarchical weighting structure and weighting values thereof used in determining the composite investment performance score for each one of said investment choices is used in determining the composite investment index performance score for each one of said indices.

24. The method of claim 21, further comprising:
said at least one data processing device accessing, from said memory, instructions causing said at least one data processing device to determine an asset class corresponding to an allocated investment within an investment portfolio; and said at least one data processing device accessing, from said memory, instructions causing said at least one data processing device to perform a comparative performance assessment between the allocated investment and a plurality of non-allocated investments represented within the asset class.

25. A system for objectively quantifying investment choices, comprising:
at least one data processing device;
instructions processable by said at least one data processing device; and
an apparatus from which said instructions are accessible by said at least one data processing device;
wherein said instructions are configured for causing said at least one data processing device to:
provide a hierarchical weighting structure including performance criteria and performance factors selected to provide a desired investment effect, wherein a first group of said performance factors subtends from a first one of said performance criteria, a second group of performance factors subtends from a second one of said performance criteria, the plurality of performance criteria comprises at least risk and return associated with said investment choices, the plurality of performance factors are at least time-based measurements of said performance criteria, and the weighting structure is configured in a manner for causing a first one of said performance factor values to be quantified based on a first quantitative scoring scale and a second one of said performance factors to be quantified based on a second quantitative scale different than the first quantitative scoring scale;

provide a relative weighting value for each one of said performance criteria and for each one of said performance factors selected to provide the desired investment effect;

provide a plurality of investment choices to be ranked;
provide a performance factor value corresponding to each one of said performance factors for each one of said investment choices;

generate a score for each one of said performance factors for each one of said investment choices, wherein the score for each one of said performance factors is derived from the corresponding one of said performance factor values and the corresponding relative weighting value;

derive a composite investment performance score from said performance factor scores and the corresponding relative weighting value for each one of said performance criteria for each one of said investment choices;

determine a collection of indices, wherein each one of said indices corresponds to a respective investment within an investment portfolio;

determine a composite investment index performance score for each one of said indices in the same manner as the composite investment performance score for each one of said investment choices is determined such that the weighting structure and weighting values thereof used in determining the composite investment performance score for each one of said investment choices is used in determining the composite investment index performance score for each one of said indices;

rank each one of said investment choices based on the composite investment performance score; and rank each one of said indices based on the composite investment index performance.

26. The system of claim 25 wherein said instructions are configured for causing said at least one data processing device to:

determine an asset class corresponding to an allocated investment within an investment portfolio; and perform a comparative performance assessment between the allocated investment and a plurality of non-allocated investments represented within the asset class.

27. A method, comprising:

at least one data processing device of a data computing system accessing, from memory coupled to said at least one data processing device, instructions causing said at least one data processing device to provide a hierarchical weighting structure including performance criteria and performance factors selected to provide a desired investment effect, wherein a first group of said performance factors subtends from a first one of said performance criteria, a second group of performance factors subtends from a second one of said performance criteria, the plurality of performance criteria comprises at least risk and return associated with said investment choices, the plurality of performance factors are at least time-based measurements of said performance criteria, and the weighting structure is configured in a manner for causing a first one of said performance factor values to be quantified based on a first quantitative scoring scale and a second one of said performance factors to be quantified based on a second quantitative scale different than the first quantitative scoring scale;

said at least one data processing device accessing, from said memory, instructions causing said at least one data processing device to provide a relative weighting value for each one of said performance criteria and for each one of said performance factors selected to provide the desired investment effect;

said at least one data processing device accessing, from said memory, instructions causing said at least one data processing device to provide a plurality of investment choices to be ranked;

said at least one data processing device accessing, from said memory, instructions causing said at least one data processing device to provide a performance factor value corresponding to each one of said performance factors for each one of said investment choices;

said at least one data processing device accessing, from said memory, instructions causing said at least one data processing device to generate a score for each one of said performance factors for each one of said investment choices, wherein the score for each one of said performance factors is derived from the corresponding one of said performance factor values and the corresponding relative weighting value;

said at least one data processing device accessing, from said memory, instructions causing said at least one data processing device to derive a composite investment performance score from said performance factor scores and the corresponding relative weighting value for each one of said performance criteria for each one of said investment choices;

said at least one data processing device accessing, from said memory, instructions causing said at least one data processing device to determine a collection of indices, wherein each one of said indices corresponds to a respective investment within an investment portfolio;

said at least one data processing device accessing, from said memory, instructions causing said at least one data processing device to determine a composite investment index performance score for each one of said indices in the same manner as the composite investment performance score for each one of said investment choices is determined such that the weighting structure and weighting values thereof used in determining the composite investment performance score for each one of said investment choices is used in determining the composite investment index performance score for each one of said indices;

said at least one data processing device accessing, from said memory, instructions causing said at least one data processing device to rank each one of said investment choices based on the composite investment performance score; and said at least one data processing device accessing, from said memory, instructions causing said at least one data processing device to rank each one of said indices based on the composite investment index performance.

28. The method of claim 27, further comprising:

said at least one data processing device accessing, from said memory, instructions causing said at least one data processing device to determine an asset class corresponding to an allocated investment within an investment portfolio; and said at least one data processing device accessing, from said memory, instructions causing said at least one data processing device to perform a comparative performance assessment between the allocated investment and a plurality of non-allocated investments represented within the asset class.

* * * * *